(12) United States Patent
Sasagawa

(10) Patent No.: US 7,167,847 B2
(45) Date of Patent: Jan. 23, 2007

(54) DNA COMPUTER AND A COMPUTATION METHOD USING THE SAME

(75) Inventor: Fumiyoshi Sasagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 207 days.

(21) Appl. No.: 11/064,027

(22) Filed: Feb. 23, 2005

(65) Prior Publication Data

US 2006/0121493 A1 Jun. 8, 2006

Related U.S. Application Data

(63) Continuation of application No. PCT/JP03/00918, filed on Jan. 30, 2003.

(51) Int. Cl.
*G06N 5/00* (2006.01)
(52) U.S. Cl. .......................... 706/13; 706/45
(58) Field of Classification Search ................. 706/13, 706/45; 712/28
See application file for complete search history.

(56) References Cited

U.S. PATENT DOCUMENTS

| | | | |
|---|---|---|---|
| 7,076,472 B2* | 7/2006 | Addison | 706/13 |
| 2004/0143725 A1* | 7/2004 | Addison | 712/28 |
| 2006/0121493 A1* | 6/2006 | Sasagawa | 435/6 |

FOREIGN PATENT DOCUMENTS

JP 2002-318992 10/2002
WO 97/07440 2/1997

OTHER PUBLICATIONS

Masaki Hagitani, et al., "DNA Computer", First Edition, Baifukan Co., Ltd., Dec. 26, 2001, pp. 87-95, ISBN 4-563-01549-0.
Ryosuke Ukai et al., "Joho Sossa o Mochiita DNA Keisan ni okeru Hamilton Keiro Mondai no Kaiho ni tsuite", The Institute of Electronics, Information and Communication Engineers Gijutsu Kenkyu Hokoku, May 17, 2002, vol. 102, No. 90, pp. 33-40.
Ed. Hiroaki Kitano, "Idenshi Algorithm 4", First Edition, Sangyo Tosho Kabushi Kaisha, Aug. 30, 2000, pp. 3-15, ISBN 4-7828-5149-9.
Ed. Information Processing Society of Japan, "Shinpan Joho Shori Handbook", First Edition, Ohmsha Ltd., Nov. 25, 1995, pp. 34 to 36, ISBN: 4-274-07832-9.
Jian-Bo Yang, "GA-Based discrete dynamic programming approach for scheduling in FMS environments", IEEE Transactions on Systems, Man and Cybernetics, Part B, Oct. 2001, vol. 31, pp. 824-835, ISSN: 1083-4419.
Baum, E.B. et al., Running Dynamic Programming Algorithms on a DNA computer< Proc> of DIMACS Workshop: DNA Based Computers II, 1999, pp. 77-85, ISBN: 0-8218-0756-0.

(Continued)

*Primary Examiner*—Wilbert L. Starks, Jr.
(74) *Attorney, Agent, or Firm*—Staas & Halsey LLP

(57) ABSTRACT

A DNA computer for carrying out computations using DNAs is provided with a dividing part for dividing a problem that is to be solved into a plurality of partial problems, and an operation part for obtaining a DNA sequence corresponding to a solution to the problem, by combining DNA sequences corresponding to solutions of the plurality of partial problems.

20 Claims, 26 Drawing Sheets

OTHER PUBLICATIONS

Yoshida, H. et al., Solution to 3-SAT by breadth First Search, Proc. of DIMACS Workshop: DNA Based Computers V, 2000, pp. 9-22, ISBN: 0-8218-2053-2.

Morimoto, N. et al., Solid Phase DNA Solution to the Hamiltonian Path Problem, Proc. of DIMACS workshop: DNA Based Computers III, 1999, pp. 193-206, ISBN 0-8218-0842-7.

Leonard M. Adleman, "Molecular Computation of Solutions to Combinatorial Problems", Science, vol. 266, pp. 1021-1024, Nov. 11, 1994.

Kevin Bonsor, "How DNA Computers Will Work," http://www/howstuffworks.com/dna-computer.htm, Aug. 2002.

David E. Goldberg, "Genetic Algorithms in Search, Optimization, and Machine Learning", Addison-Wesley Publishing Company. Inc., 1989.

Carla P. Gomes, et al., "Satisfied with Physics", Science, vol. 297, pp. 784-785, Aug. 2, 2002.

Quinghua Liu, et al., "DNA Computing on surfaces", Nature, vol. 403, pp. 175-179, Jan. 13, 2000.

Akira Toyama, "Experiments on Molecular Computers", Suuri Kagaku, No. 445, pp. 27-31, Jul. 2000 [No English Translation].

Takashi Miyata, et al., "Divergence Pattern of Animal Gene Families and Relationship with the Cambrian Explosion", BioEssays 23.11, Review articles, pp. 1018-1027, 2001.

Takashi Miyata, "Divergence Pattern of Animal Gene Families and Relationship with the Cambrian Explosion", Nikkei Science, Mar. 2004.

* cited by examiner

REPRODUCTION

MUTATION        CROSSOVER

REPRODUCTION

CHROMOSOMES        FITNESS f0 f1 f2 fn

FIG.3
CROSSOVER
PARENT
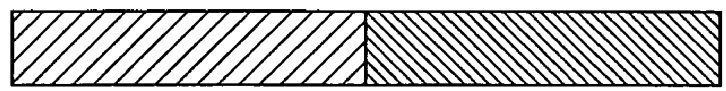
CHILD
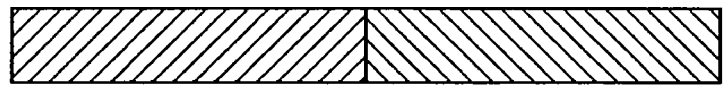
FIG.4
MUTATION
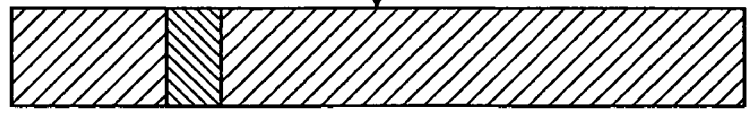

FIG.15

| OLIGONUCLEOTIDE (DNA FRAGMENT) | D₀ | D₁ | D₂ | D₃ | D₄ |
|---|---|---|---|---|---|
| LENGTH (NO. OF BASES) OF OLIGONUCLEOTIDE (DNA FRAGMENT) | 4 | 2 | 3 | 5 | 4 |
| GC CONTENT (ARBITRARY UNITS) | 21 | 16 | 19 | 28 | 23 |

FIG.23

| CANDIDATE SOLUTION | a1 | a2 | b1 | b2 | c1 | c2 |
|---|---|---|---|---|---|---|
| GC CONTENT (ARBITRARY UNIT) | 10 | 9 | 1 | 5 | 5 | 7 |

FIG.30

N1: AAACCC
N2: AAGCCG
N3: AGACGC
N4: GAAGCC
N5: CCCAAA
N6: CCGAAG
N7: CGCAGA
N8: GCCGAA
N9: TTTGGG
N10: TTAGGA
N11: TATGAG
N12: ATTAGG
N13: ATTGAC
N14: GTTTAC

FIG.31

- 1→2  CTTGGG
- 1→3  TCTGGG
- 2→3  TCTCGG
- 2→4  TTCCGG
- 3→4  TTCGCG
- 3→5  GGGGCG
- 4→5  AAAAAC
- 4→6  CGGGGC
- 4→13 AATGGC
- 5→7  GCGTTT
- 5→6  CGGTTT
- 6→7  GCGCTT
- 6→8  GGCCTT

- 7→8  GGCTCT
- 7→9  AAATCT
- 8→9  AAATTC
- 8→10 TAATTC
- 9→10 TAACCC
- 9→11 ATACCC
- 10→11 ATATCC
- 10→12 AATTCC
- 11→12 AATCTC
- 13→5  GGGGTC
- 13→14 AACGTC
- 14→6  CGGGTA

DNA COMPUTER AND A COMPUTATION METHOD USING THE SAME

This application is a continuation application filed under 35 U.S.C. 111(a) claiming the benefit under 35 U.S.C. 120 and 365(c) of a PCT International Application No. PCT/JP2003/000918 filed Jan. 30, 2003, in the Japanese Patent Office, the disclosure of which is hereby incorporated by reference.

BACKGROUND OF THE INVENTION

1. Field of the Invention

The present invention generally relates to DNA computers and computation methods using the same, and more particularly to a DNA computer suited for complex computations and a computation method using such a DNA computer.

2. Description of the Related Art

The DNA computer solves, at a high speed, a satisfiability (SAT) problem or the like having an extremely large solution search space, using molecular reaction. The hardware of the DNA computer is formed by molecules called nucleotides forming the DNA. A nucleotide sequence of the DNA obtained by subjecting the DNA to a basic operation of the DNA computer, becomes the output of the DNA computer. The nucleotide sequence of the DNA representing the output of the DNA computer is amplified using a Polymerase Chain Reaction (PCR) that creates a large amount of copies of the nucleotide sequence. It is possible read the output of the DNA computer by determining the nucleotide sequence of the DNA by electrophoresis using differences in molecular weights of the nucleotides.

1.1 Genetic Algorithm

The genetic algorithm is a technique that simulates genetic mechanisms of organisms for application to engineering, as described in D. Goldberg, "Genetic Algorithms in Search, Optimization, and Machine Learning", Addison-Wesley, 1989, for example.

In the evolution stage of the organisms, when a new individual (child) is born from an existing individual (parent), the crossover of chromosomes of the individuals, the mutation of the genes of the chromosomes, and the like occur. The individuals that do not adapt to the environment are subject to selection, and the individuals that adapt to the environment survive the selection to become new parents, to thereby create new progeny.

Accordingly, the group of individuals that adapt to the environment survive. The extent to which each individual adapts to the environment (that is, fitness) is determined by the chromosome (one-dimensional string of genes). In genetic algorithms, the solution candidates for a satisfiability problem are represented by chromosomes which are one-dimensional string of genes, and the optimum solution is searched by repeatedly carrying out operations, such as selection, reproduction, crossover and mutation, with respect to the group of solution candidates. FIG. 1 is a diagram showing examples of the generations in the genetic algorithm.

A target function of the satisfiability problem corresponds to the environment, and a fitness function that takes a larger value as the target function becomes more optimized is defined with respect to the chromosome. The selection (or reproduction) is an operation of selecting with a higher probability the individual with the chromosome having a high fitness in the group so that the selected individual becomes the parent of the next generation. FIG. 2 is a diagram showing an example of the selection in the genetic algorithm. The crossover is an operation of creating a new individual (child) by interchanging portions of 2 chromosomes (parents). FIG. 3 is a diagram showing an example of the crossover of the genetic algorithm. The mutation is an operation of randomly replacing the genes of a portion of 1 chromosome. FIG. 4 is a diagram showing an example of the mutation in the genetic algorithm.

By repeating such operations, the chromosome having a high fitness, that is, the solution which optimizes the target function, is obtained.

1.2 DNA Computer

As described in Kevin Bonsor, "How DNA computer will work", WWW, August, 2002 (http://www.howstuffworks.com/dna-computer1.htm), for example, the DNA computer carries out computations using the DNA which is the genetic information of organisms. FIG. 5 is a flow chart showing an example of a computation process of the DNA computer. In FIG. 5, a step S1 encodes a problem that is to be solved by the computation process into DNAs. A step S2 carries out a hybridization so as to create a sufficient amount of DNAs as solution candidates. A step S3 carries out a screening of the solution candidates by the DNA computer, so as to select a solution from the solution candidates.

The DNA is formed by deoxyribonucleic acid. The deoxyribonucleic acid is formed by nucleotides. The nucleotide is formed by sugar, phosphorylation and base. The sugar and phosphorylation are common to the deoxyribonucleic acid, but 4 kinds of bases exist depending on the base, namely, adenine (A), guanine (G), cytosine (C) and thymine (T). The 5' phosphorylzation of the nucleotide and the 3' hydroxyl group bond to form a kind of covalent bond (phosphodiester bond). The new nucleotide is added to the 3' determinal of the DNA. The base portion of the nucleotide bonds to the base portion of another nucleotide by hydrogen bond. The bonding element that bonds to the base portion of the nucleotide is restricted, and the base pair may be formed by A and T or, by G and C, due to complementation.

The DNA computer encodes the solution candidates for the given problem using the 4 kinds of nucleotides A, T, G and C, as shown in FIG. 6. FIG. 6 is a diagram showing an example of the encoding of the solution candidates for a case where an effective Hamiltonian path problem is solved. Such an encoding of the solution candidates is described in Hagitani et al., "DNA Computer", Baifukan, pp. 137–143, 2001, for example.

The solution candidates for the problem that are encoded in this manner are fed to a test tube S containing a solution (or liquid), so that basic operations which will be described later are carried out. The basic operations include 5 operations, namely, "amplify", "merge", "get", "append" and "detect". The basic operations themselves are described in A. Toyama, "Experiments in Molecular Computer", Risukagaku, (445), pp. 24–31, 2000, for example.

The "amplify" operation creates a copy of what is within the test tube S containing the DNA. The "merge" operation merges test tubes S1 and S2 containing the DNAs into 1 test tube S=S1 U S2. The "get" operation gets from the test tube S the DNA satisfying (or not satisfying) a condition described by a code sequence of the nucleotides A, T, G and C and feeds this DNA to another test tube. The "append" operation appends a specified nucleotide sequence if the terminal of the DNA molecule in the test tube S satisfies a certain condition. The "detect" operation returns a "true" if the test tube S contains at least 1 DNA, and otherwise returns a "false", with respect to the test tube S.

The DNA computer combines the 5 operations described above depending on the problem to be solved, and obtain the solution from the solution candidates of the initially prepared DNAs. Such a computation method of the DNA computer is described in Leonard M. Adleman, "Molecular computation of solutions to combinational problems", SCIENCE, 266 (5187), pp. 1021–1024, 1994, for example, and are often referred to as the "Adleman paradigm".

FIG. 7 is a diagram showing an example of the screening for a case where the effective Hamiltonian path problem is solved. In FIG. 7, S11 denotes a problem encoding stage, S2 denotes a hybridization stage, and S13 denotes a screening stage.

However, according to the conventional DNA computer, the amount of DNAs that are required increases as the computation becomes more complex. As a result, there were problems in that it is difficult to actually carry out the computation process, and that it is difficult to carry out an accurate computation process since an extremely large number of computation steps are required which in turn increases an error generation rate of the solution.

SUMMARY OF THE INVENTION

Accordingly, it is a general object of the present invention to provide a novel and useful DNA computer and computation method using the DNA computer, in which the problems described above are suppressed.

Another and more specific object of the present invention is to provide a DNA computer and a computation method using the DNA computer, which can easily carry out a computation process without increasing the amount of DNAs that are required even when the computation becomes complex, and can carry out an accurate computation process by suppressing the error generation rate of the solution by carrying out the computation process in a relatively small number of computation steps.

Still another object of the present invention is to provide a DNA computer for carrying out computations using DNAs, comprising a dividing part configured to divide a problem that is to be solved into a plurality of partial problems; and an operation part configured to obtain a DNA sequence corresponding to a solution to the problem, by combining DNA sequences corresponding to solutions of the plurality of partial problems. According to the DNA computer of the present invention, it is possible to easily carry out the computation process without increasing the amount of DNAs that are required even when the computation becomes complex, and carry out an accurate computation process by suppressing the error generation rate of the solution by carrying out the computation process in a relatively small number of computation steps.

A further object of the present invention is to provide a computation method using a DNA computer that carries out computations using DNAs, comprising a dividing step dividing a problem that is to be solved into a plurality of partial problems; and an operation step obtaining a DNA sequence corresponding to a solution to the problem, by combining DNA sequences corresponding to solutions of the plurality of partial problems. According to the DNA computer of the present invention, it is possible to easily carry out a computation process without increasing the amount of DNAs that are required even when the computation becomes complex, and carry out an accurate computation process by suppressing the error generation rate of the solution by carrying out the computation process in a relatively small number of computation steps.

Other objects and further features of the present invention will be apparent from the following detailed description when read in conjunction with the accompanying drawings.

BRIEF DESCRIPTION OF THE DRAWINGS

FIG. 3 is a diagram showing an example of the crossover in the genetic algorithm;

FIG. 4 is a diagram showing an example of the mutation in the genetic algorithm;

FIG. 15 is a diagram showing a relationship of a length and a GC content of oligonucleotides (DNA fragments) that are combined;

FIG. 23 is a diagram for explaining a GC content of solution candidates;

FIG. 30 is a diagram for explaining an encoding scheme for nodes of the effective Hamiltonian path problem; and FIG. 31 is a diagram for explaining an encoding scheme for effective sides of the effective Hamiltonian path problem.

DESCRIPTION OF THE PREFERRED EMBODIMENTS

Figure 1:
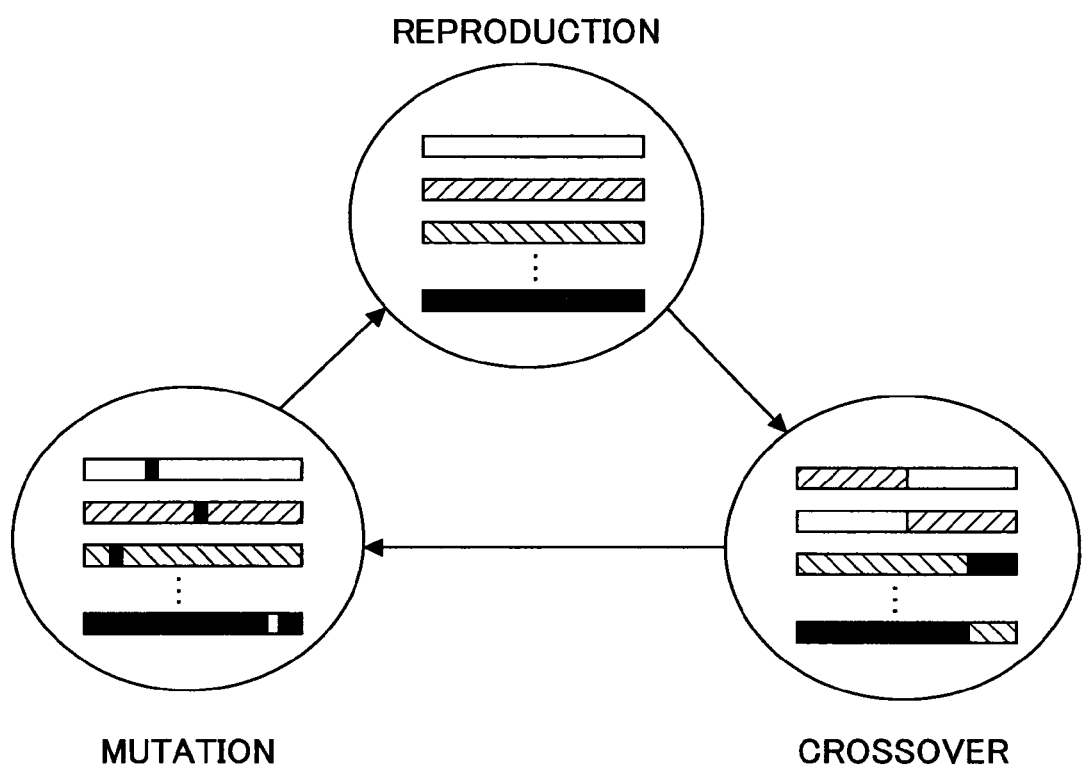
FIG. 1 is a diagram showing examples of the generations in the genetic algorithm.
Figure 2:
FIG. 2 is a diagram showing an example of the selection in the genetic algorithm.
Figure 5:
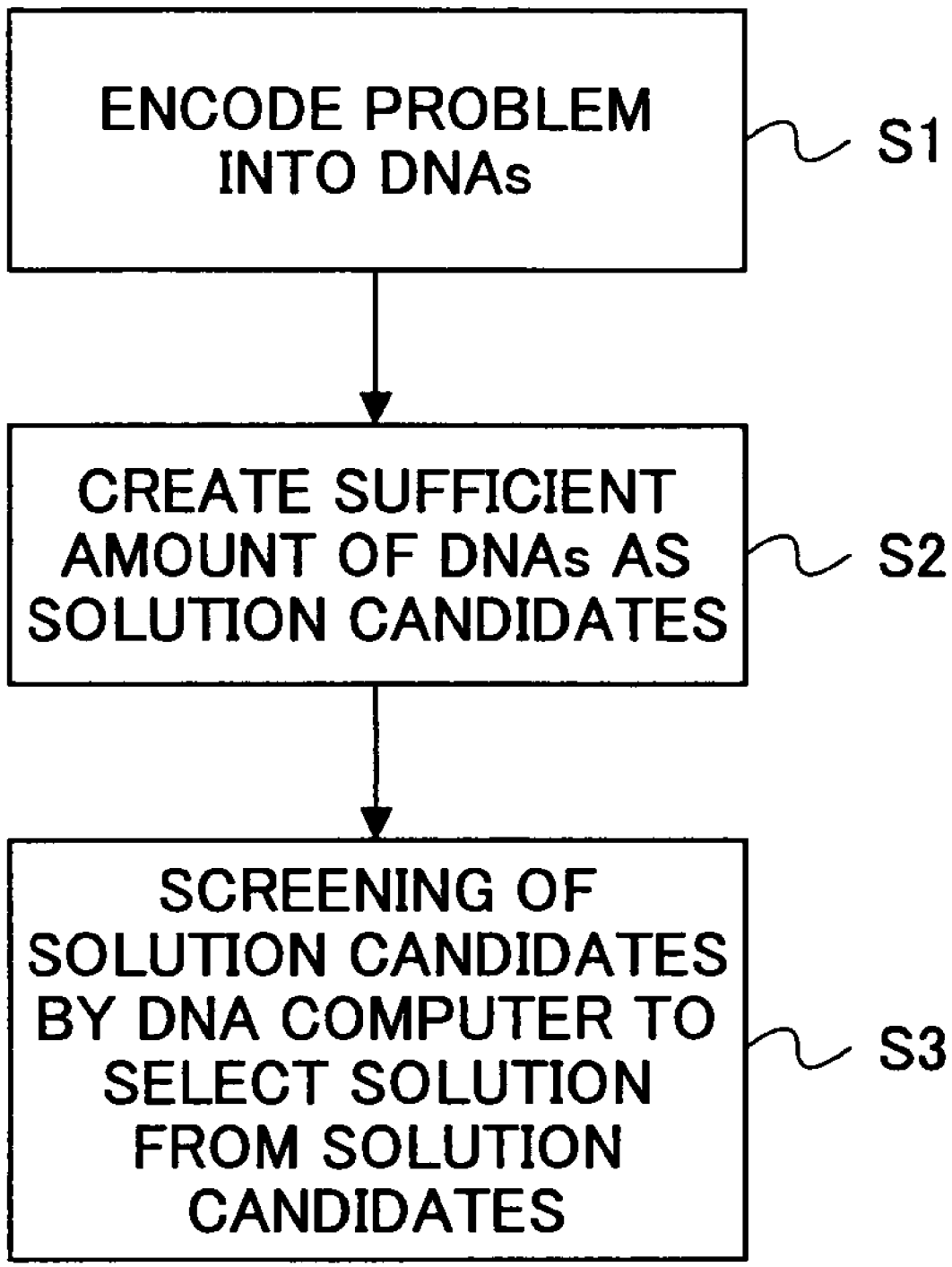
FIG. 5 is a flow chart showing an example of a computation process of a DNA computer.
Figure 6:
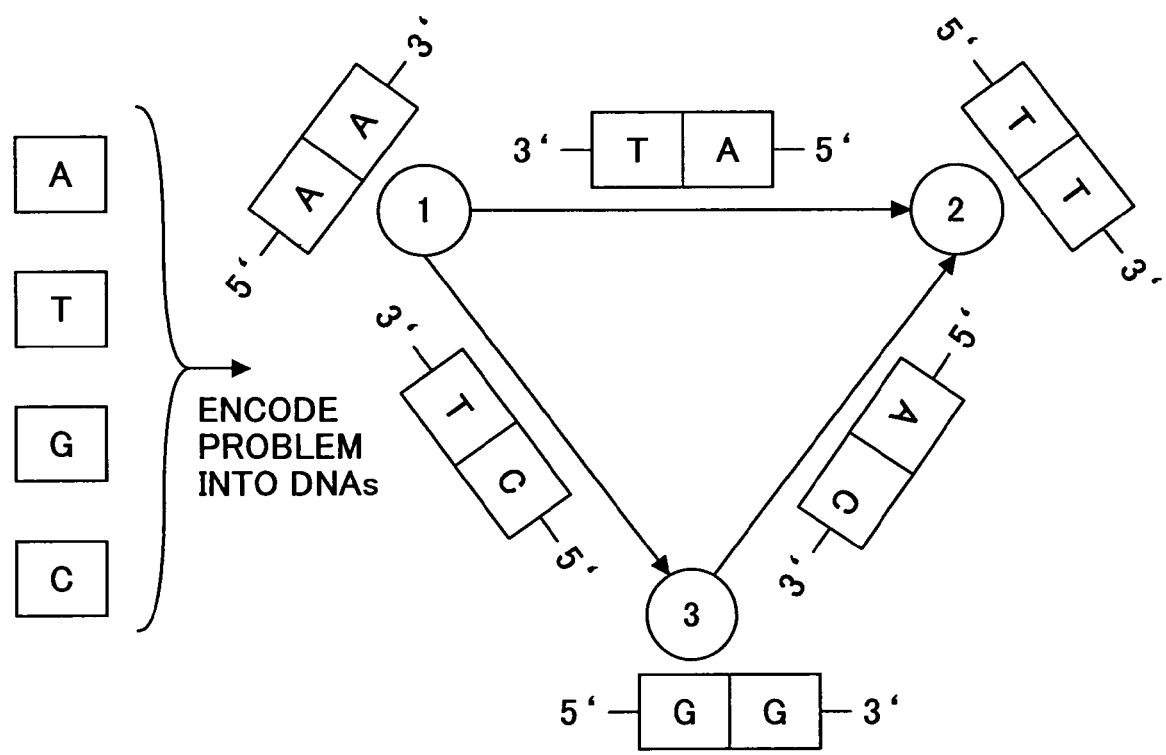
FIG. 6 is a diagram showing an example of encoding solution candidates for a case where an effective Hamiltonian path problem is solved.
Figure 7:
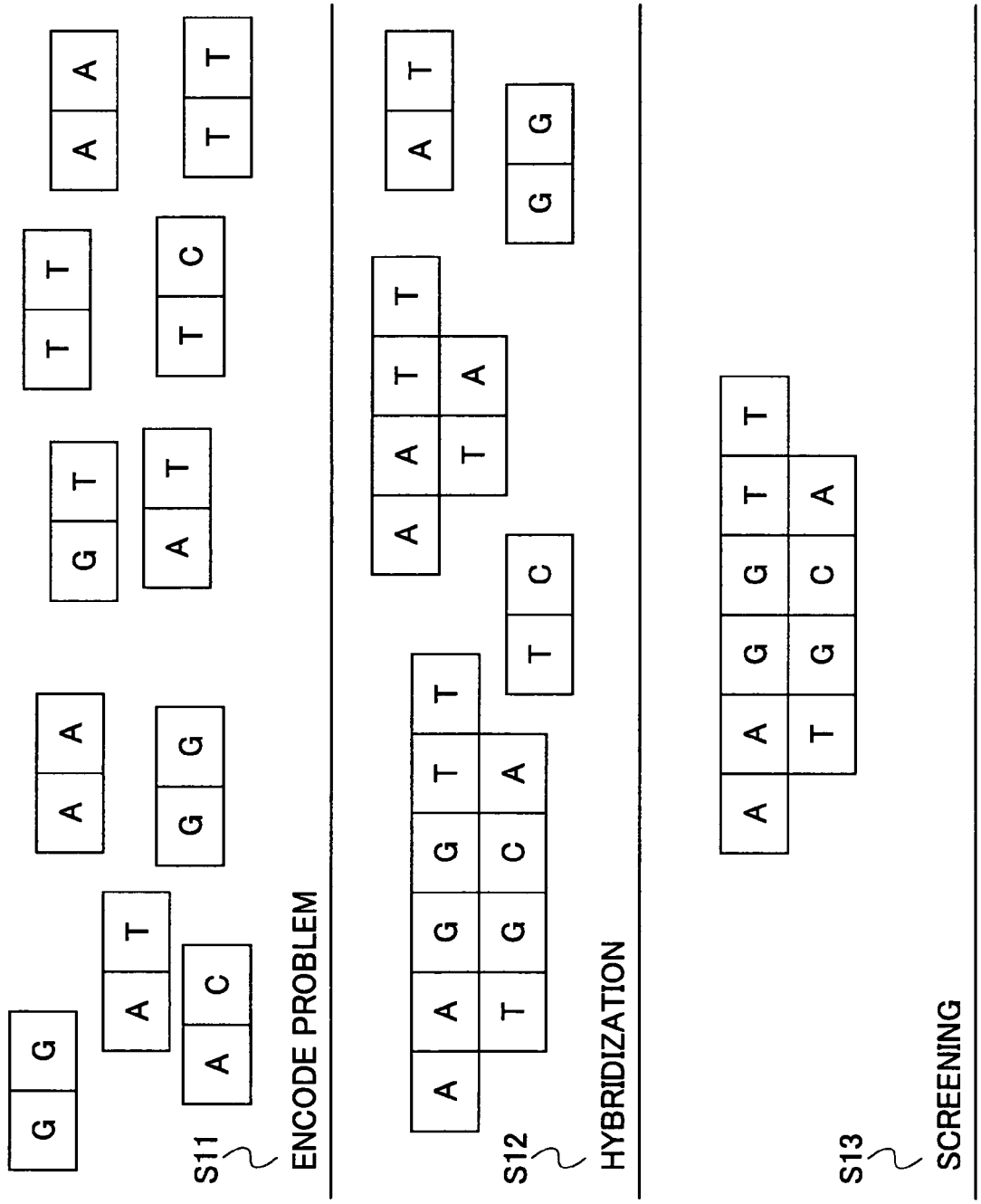
FIG. 7 is a diagram showing an example of a screening for a case where the effective Hamiltonian path problem is solved.

A description will be given of embodiments of a DNA computer according to the present invention and a computation method using the DNA computer according to the present invention, by referring to FIG. 8 and the subsequent drawings. First, a description will be given of the operating principle of this embodiment.

2.1 Operating Principle

Organisms possess genetic information that are acquired during the evolution process without dumping the accumulated genetic information. For this reason, DNA sequences of genes related to segmental structures of the organisms are similar for various ranges of species. As prokaryotes evolved to eucaryotes, and unicellular organisms evolved to mammals, one reason for the increase in the length of the DNA sequence is the accumulation of the genetic information (Takashi Miyata, "Divergence Pattern of Animal Gene Families and Relationship with the Cambrian Explosion", Nikkei Science (in Japanese), March 2004). If the genetic information is regarded as a solution to a problem, the DNA of the organism may be interpreted as a collection of solutions to the problems solved during the evolution. The ultimate problem the organism itself intends to solve is presently unknown except for the self-reproduction, but the DNA computer can solve a problem using such an evolution process.

When the DNA computer is to solve a complex problem, the amount of DNAs required for the computation becomes large, and it becomes difficult to actually carry out the computation process. For this reason, this embodiment regards the problem that is to be solved by the DNA computer as being made up of partial problems, and the solution to the entire problem is obtained by combining the solutions to the partial problems. By employing an evolution technique in the DNA computer, it is possible to suppress the increase of the amount of DNAs required for the computation process, and to improve the computation speed.

In addition, by adjusting parameters of the DNA computer by a genetic algorithm which will be described later, it is possible to reduce an error generation rate of the solution obtained by the DNA computer. In this case, if it is assumed that the problem to be solved by the computation process of the DNA computer is made up of the partial problems, the solution to the entire problem is obtained by combining the solutions to the partial problems. The solution to the entire problem is logically not dependent on an order in which the partial problems are solved. However, in the case of the DNA computer, the DNA sequence differs depending on the order in which the partial problems are solved, and there is a possibility of generating an unpredictable error. Therefore, this embodiment optimizes the parameters of the DNA computer, such as the computation order (or sequence) of the partial problems, according to the genetic algorithm, so as to reduce the error generation rate of the solution.

2.1 Structure of DNA Computer

An encoding scheme for encoding the problem that is to be solved by the computation process into the DNAs uses a combination of 1 variable xi and 4 kinds of nucleotides (adenine (A), guanine (G), cytosine (C) and thymine (T)) of the DNA representing the values of the variable xi. In other words, the problem that is to be solved is encoded into a nucleotide sequence representing the variable xi and a nucleotide sequence representing the value (for example, "true" or "false") of the variable xi.

The solution candidates for the problem that is encoded in this manner are fed to a test tube S containing a solution (or liquid), wherein basic operations are carried out. The basic operations include the 5 operations, namely, "amplify", "merge", "get", "append" and "detect".

The "amplify" operation is represented by amplify (S, S1, . . . , Si, . . . ), and amplifies a partial set of DNAs satisfying a certain condition, of the DNAs within the test tube S, and feeds the partial set of DNAs satisfying the certain condition to another test tube Si.

The "merge" operation is represented by S=merge (S1, S2, . . . ), and combines 2 or more test tubes S1, S2, . . . containing the DNAs into 1 test tube S.

The "get" operation is represented by S1=get (S, condition), and gets (or extracts) from the test tube S the DNA satisfying (or not satisfying) a condition described by a code sequence of the nucleotides A, T, G and C and feeds this DNA to another test tube S1.

The "append" operation is represented by S1=append (S, x), and appends a specified nucleotide sequence if the terminal of the DNA molecule in the test tube S satisfies a certain condition, where x denotes the nucleotide sequence that is appended, and Si denotes a set of DNAs (test tube) that are obtained by appending the nucleotide sequence x to the DNAs within the test tube S.

The "detect" operation confirms whether or not the test tube S contains DNAs. That is, the "detect" operation returns a "true" if the test tube S contains at least 1 DNA, and otherwise returns a "false".

The DNA computer combines the 5 operations described above depending on the problem that is to be solved, so as to obtain the solution from the solution candidates of the initially prepared DNAs.

2.3 Control Method (Algorithm) For DNA Computer

As prokaryotes evolved to eucaryotes, and unicellular organisms evolved to mammals, the length of the DNA sequence has become longer if the evolution is viewed on a long time scale. One reason for the increase in the length of the DNA sequence is the accumulation of the genetic information. As described above, if the genetic information is regarded as a solution to a problem, the DNA of the organism may be interpreted as a collection of solutions to the problems solved during the evolution. Hence, this embodiment employs the evolution technique that similarly represents the solution to the partial problem by a one-dimensional sequence, and obtains the solution or the solution candidate for the original problem by combining the solutions to the partial problems and searching for the solution to the original problem.

Figure 8:
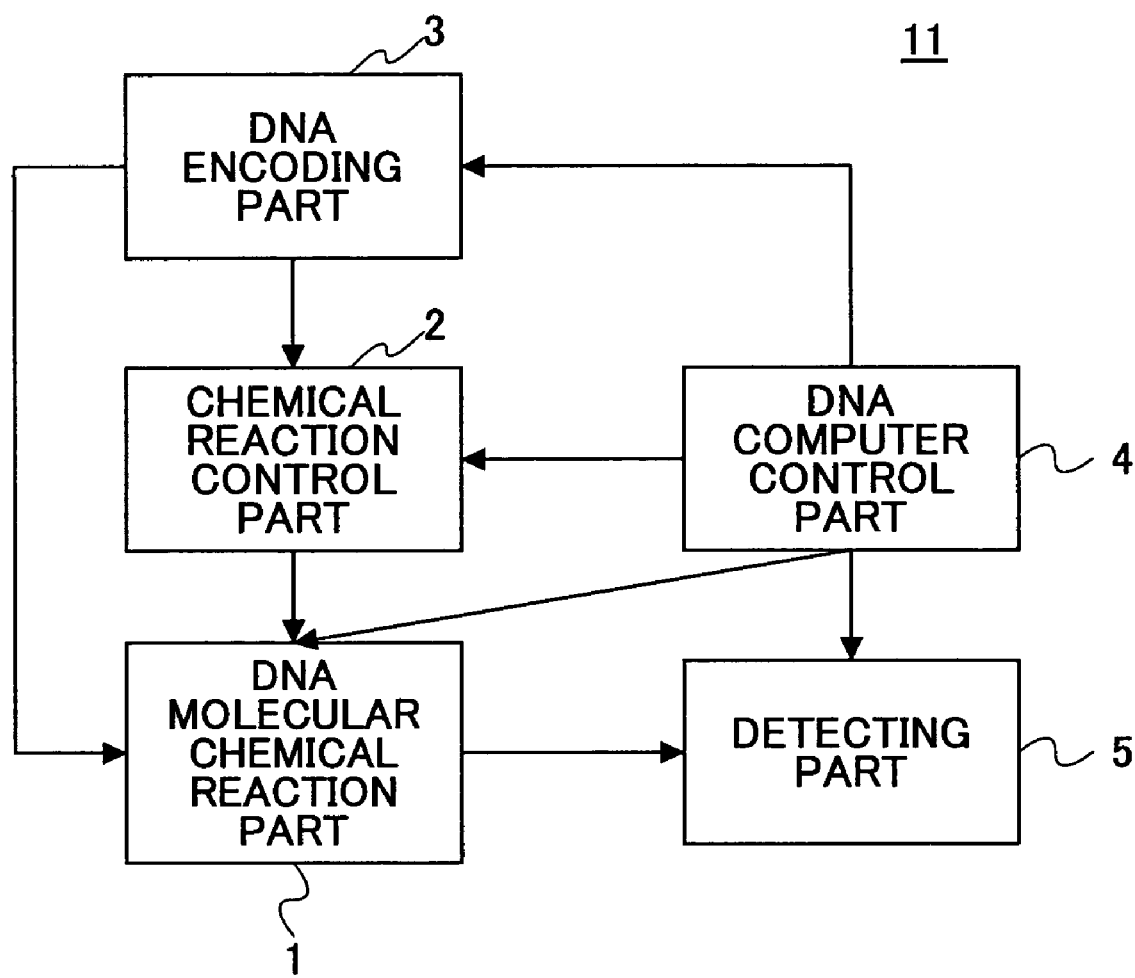
FIG. 8 is a system block diagram showing a structure of a DNA computer.

FIG. 8 is a system block diagram showing a structure of a DNA computer 11. In FIG. 8, a DNA molecular chemical reaction part 1 is formed by a test tube containing DNAs within a solution (or liquid). A chemical reaction control part 2 supplies enzymes, primers (DNA fragments) or the like to the DNA molecular chemical reaction part 1. A DNA encoding part 3 prepares the DNAs necessary for the setup of the DNA computer 11. A DNA computer control part 4 is formed by a general purpose computer, and store a program that utilizes the basic operations of the DNA computer 11. The DNA computer control part 4 instructs operations to the chemical reaction control part 2 and the DNA molecular chemical reaction part 1. A detecting part 5 includes an apparatus for reading an output (DNA sequence) of the DNA computer 11 by electrophoresis or the like.

In this embodiment, the evolution technique is applied to the DNA computer 11 shown in FIG. 8, so as to store the solution to the partial problem as a corresponding nucleotide sequence, and to use the nucleotide sequence when solving the next partial problem. In this state, a judgement is made by computer simulation to determine whether or not there is a possibility that the solution to the partial problem becomes a portion of the solution to the original problem, and the operations of the DNA computer 11 are carried out if the possibility exists, while the operations of the DNA computer 11 are not carried out if the possibility does not exist. In addition, a solution to a partial problem, which is one prior to the solution to the partial problem that has become known to finally fail as a result of the computer simulation, is not dumped but is stored. The solution to the partial problem that is stored in this manner may be utilized when obtaining a solution to another partial problem, so that the solution may be obtained efficiently.

Next, a case will be considered where a partial problem Pk of a certain problem P may be defined. A restricted solution candidate (that is, a solution candidate with a restriction) Ck for a partial problem Pk is defined as a case where "Ck is a solution to the partial problem Pk" or "it cannot be explicitly shown that Ck is not a portion of the solution to the problem P (that is, there is a possibility that Ck is a portion of the solution to the problem P)". Since the solution is always represented as a nucleotide sequence (one-dimensional sequence of A, T, G and C) in the case of the DNA computer 11, it is assumed that Ck+1 includes Ck when an arbitrary restricted solution candidate Ck to the partial problem Pk is a portion of a restricted solution candidate Ck+1 to a partial problem Pk+1, and that the partial problem Pk+1 includes the partial problem Pk in this case.

By clarifying by computer simulation whether or not the restricted solution candidate for the partial problem Pk+1 derived from a solution candidate for the partial problem Pk becomes an actual candidate solution, it is possible to improve the computation efficiency of the DNA computer 11 by not carrying out the operations in the DNA computer 11 if the restricted solution candidate to the partial problem Pk+1 does not become the actual solution candidate.

Moreover, if it is clarified by computer simulation that a solution candidate γk+1 (not necessarily a restricted solution candidate) for the partial problem Pk does not become a solution to the problem P, a technique which creates a solution that is different from the solution candidate γk+1 from the restricted solution candidate Ck for the partial problem Pk which is one prior to the partial problem Pk+1, and finds a restricted solution candidate for the partial problem Pk+1 may be employed. In this case, it is possible to improve the computation efficiency of the DNA computer 11.

The solution to the problem P satisfying the restricting conditions of the problem P is selected from the restricted solution candidates that are obtained by solving the partial problems P1, P2, . . . , PN in this order. In the sequence of such partial problems P1, . . . , PN, the solution candidate for a partial problem Pi (i=2, . . . , N) is formed by using the solution candidate for the partial problem Pi−1 which is one prior to the partial problem Pi, similarly as in the case of the evolution process of organisms.

2.4 Division of Problem into Partial Problems

According to the Adleman paradigm, solution candidates are all prepared in advance, and the solution is selected from the solution candidates so as to reduce the computation time. However, in the case of a large-scale problem, the total number of solution candidates is extremely large, thereby making this solving technique unrealistic. Hence, according to this embodiment, if the problem is divisible into a plurality of partial problems, the partial problems are sequentially solved by the DNA computer 11, so as to realize a realistic solving technique for the large-scale problem. The algorithms of the DNA computer 11 that are applicable when the problem is divisible into the partial problems include a serial division technique and a layered network division method which will be described later.

Figure 9:
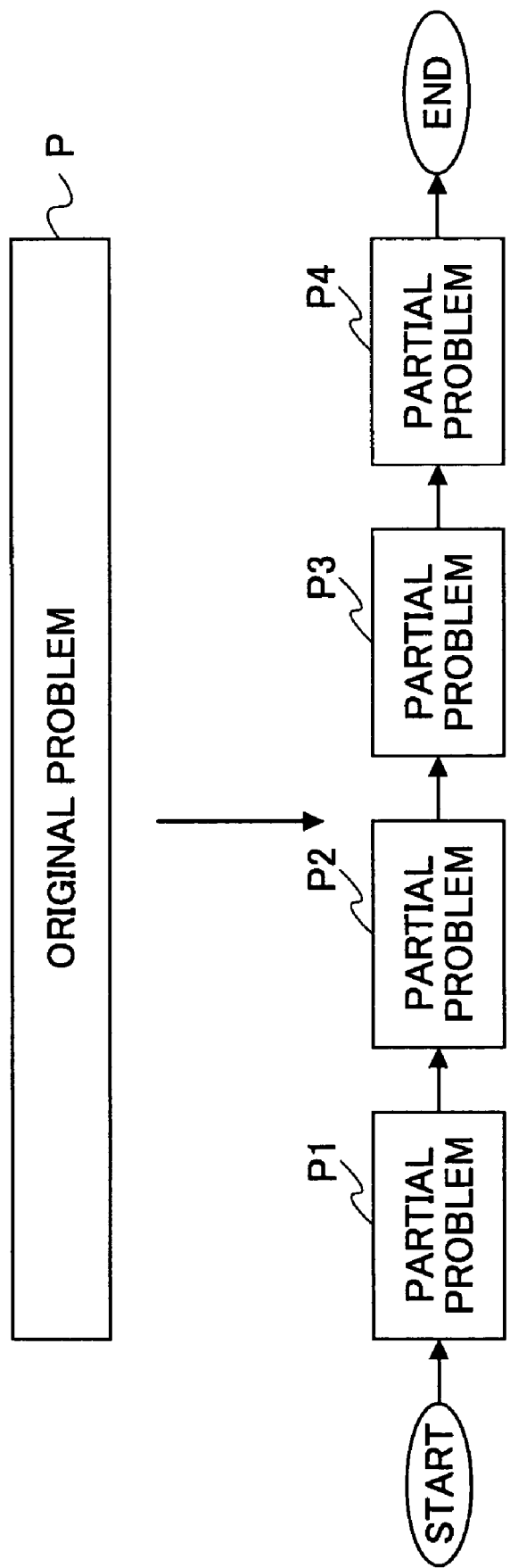
FIG. 9 is a diagram for explaining a case where a problem is divided into partial problems according to a serial division method.

2.4.1 Series Division Method:

In the case of the serial division method, the solution to the partial problem Pk is used as a portion of the input when solving the partial problem Pk+1, where k=1, 2, . . . , N. Such a relationship is represented by a graph in which nodes are connected by arcs, by regarding the partial problems P and Pk+1 as nodes. FIG. 9 is a diagram for explaining a case where a problem is divided into partial problems according to the serial division method. For the sake of convenience, FIG. 9 shows a case where the original problem P is divided into 4 partial problems P1 through P4 and connected by arcs forming the graph.

Figure 10:
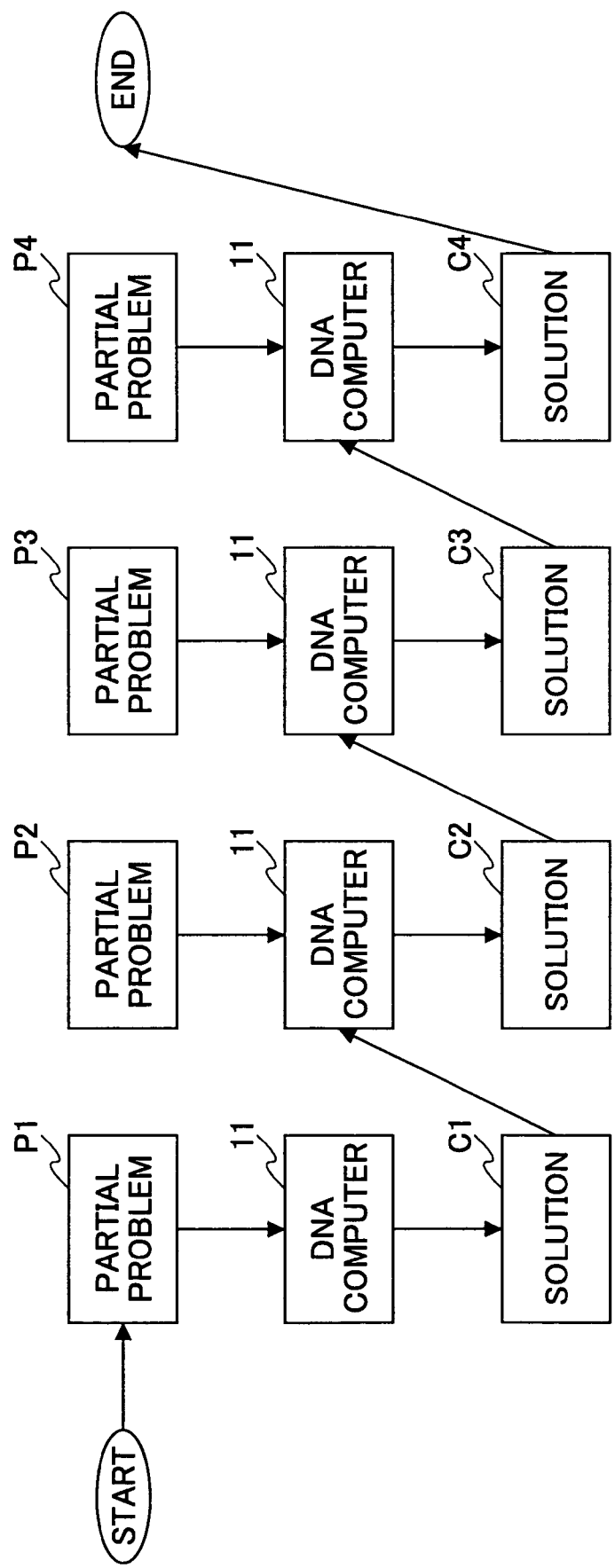
FIG. 10 is a diagram for explaining the operation of the DNA computer for the case where the problem is divisible into the partial problems by the serial division method.

FIG. 10 is a diagram for explaining the operation of the DNA computer 11 for the case where the problem is divisible into the partial problems by the serial division method. In FIG. 10, the partial problem P1 is solved by the DNA computer 11, and a solution C1 is fed back to the DNA computer 11. The partial problem P2 is solved by the DNA computer 11 using the solution C1, and a solution C2 is fed back to the DNA computer 11. The operations are carried out similarly thereafter, and when a solution C4 is output from the DNA computer 11, the operations end.

For example, suppose that the solution to the partial problem P1 can be represented by a nucleotide sequence C1. In this case, a marker is added to the 3' terminal of the nucleotide sequence C1 to indicate that this solution is a solution to the partial problem P1. Using the nucleotide sequence C1, a nucleotide sequence C2 which is the solution to the partial problem P2 is bonded to the nucleotide sequence C1. A marker is added to the 3' terminal of the nucleotide sequence C2 to indicate that this solution is a solution to the partial problem P2, and similar operations are repeated thereafter. Therefore, as an encoding scheme for the solution to the partial problem, it is possible to represent the solution by a combination of the nucleotide sequence indicating the partial problem and the nucleotide sequence representing the solution. In addition, the nucleotide sequence representing the solution may be arranged at a center portion, and the nucleotide sequence indicating the partial problem may be arranged on both sides thereof. In order to synthesize the nucleotide sequence representing the solution to the problem from the nucleotide sequences representing the solutions to the partial problems, it is possible to use a combination of the nucleotide sequences representing the partial problems as a primer.

In the case of the serial division method, the order in which the partial problems are solved may be switched or interchanged. In this case, the problem may be divided into the partial problems according to order of solving ease, so that the solution can be obtained within a short time.

Figure 11:
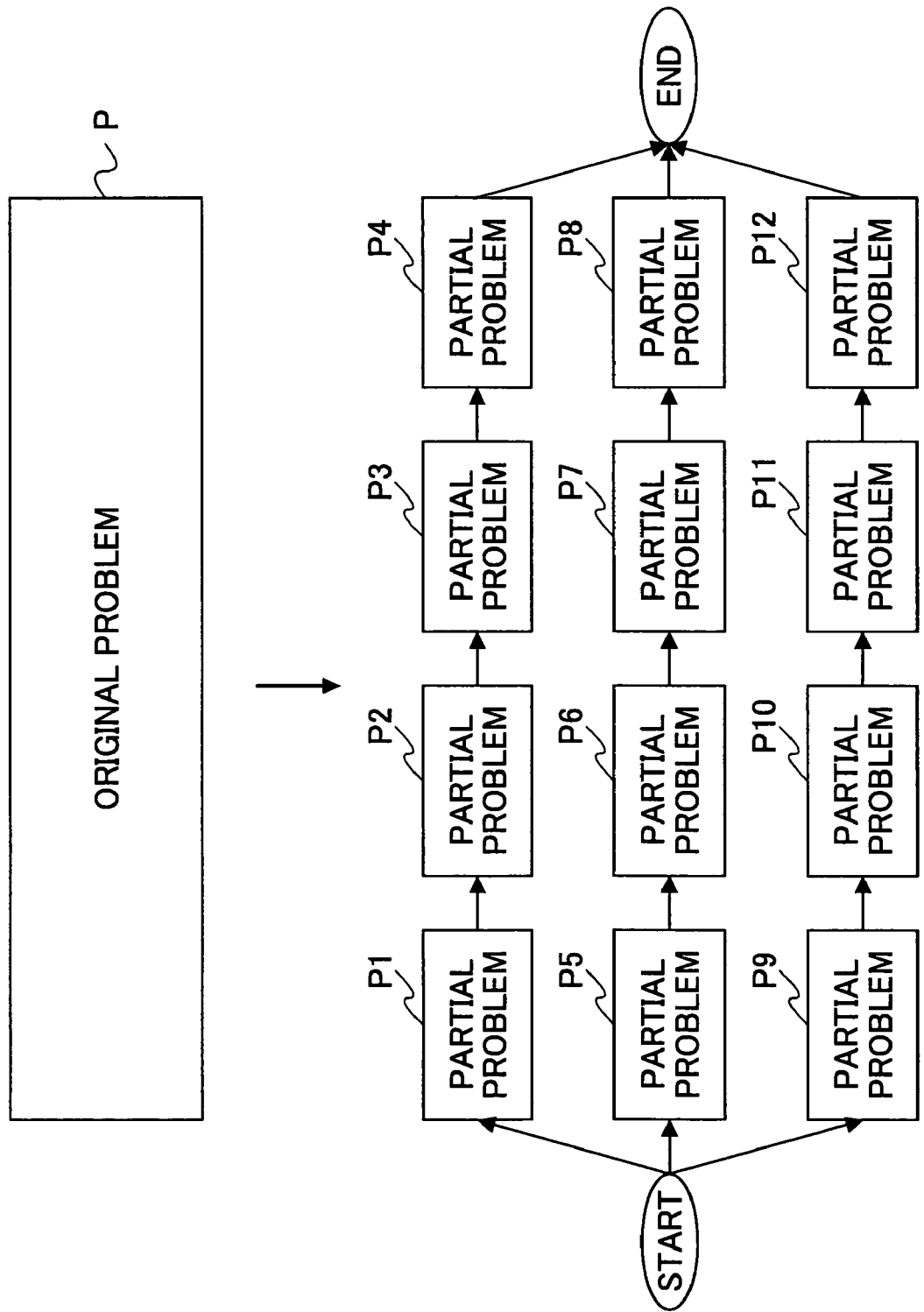
FIG. 11 is a diagram for explaining a case where a problem is divided into partial problems according to a layered network division method.

2.4.2 Layered Network Division Method:

In the case of the layered network division method, a solution to a partial problem is used as a portion of the input when solving one or more other partial problems, and a graph in which nodes are connected by arcs, by regarding the partial problems as nodes, is represented in the form of a layered network. FIG. 11 is a diagram for explaining a case where a problem is divided into partial problems according to the layered network division method. For the sake of convenience, FIG. 11 shows a case where the original problem P is segmented (or divided) into a graph in which the 4 partial problems P1 through P4 are connected by arcs, a graph in which 4 partial problems P5 through P8 are connected by arcs, and a graph in which 4 partial problems P9 through P12 are connected by arcs. Hence, the layered network shown in FIG. 12 consists of 3 layers.

Figure 12:
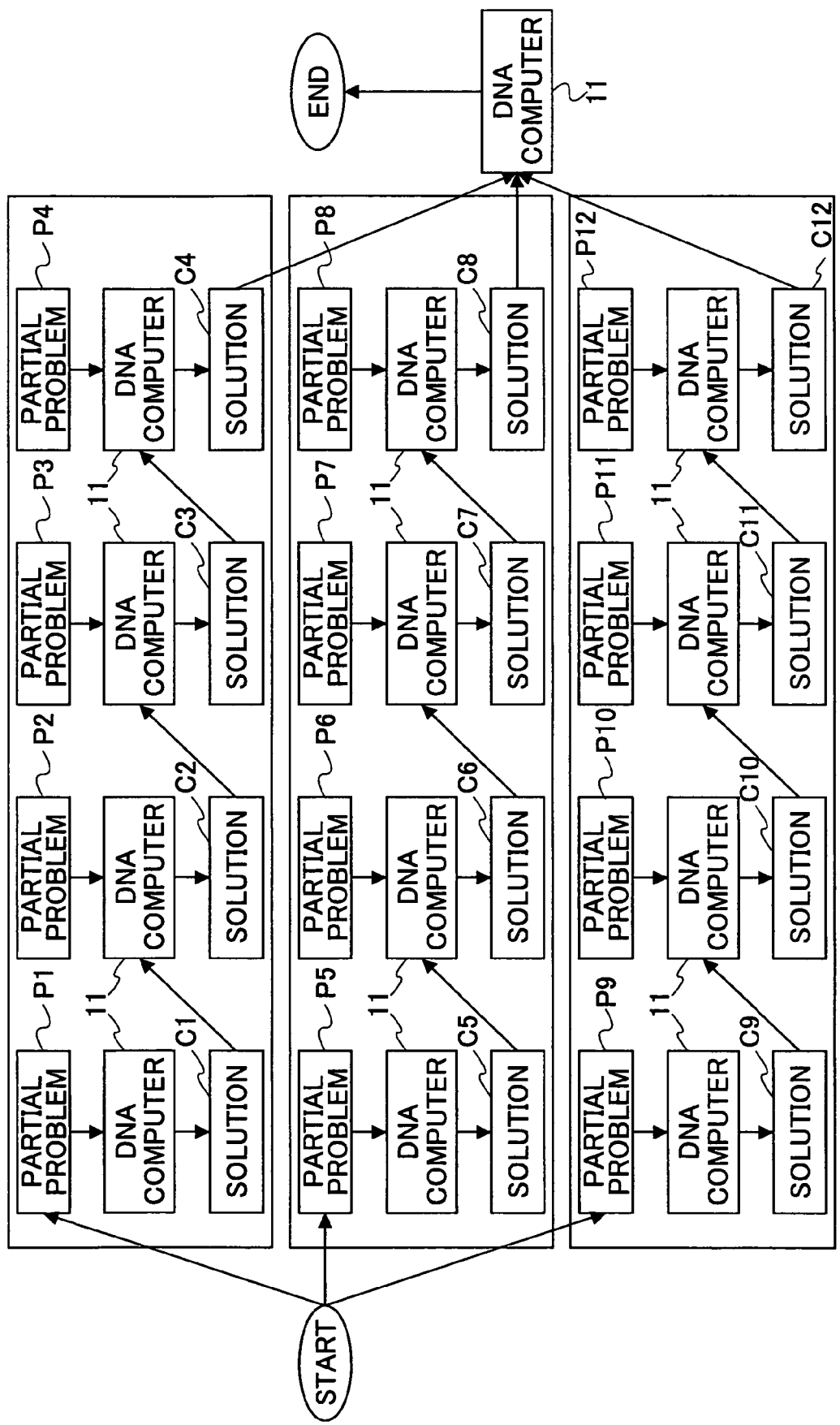
FIG. 12 is a diagram for explaining the operation of the DNA computer for the case where the problem is divisible into the partial problems by the layered network division method.

FIG. 12 is a diagram for explaining the operation of the DNA computer for the case where the problem is divisible into the partial problems by the layered network division method. In FIG. 12, the partial problem P1 is solved by the DNA computer 11, and a solution C1 is fed back to the DNA computer 11. The partial problem P2 is solved by the DNA computer 11 using the solution C1, and a solution C2 is fed back to the DNA computer 11. The operations are carried out similarly thereafter with respect to the partial problems P3 and P4, and a solution C4 is output from the DNA computer 11 and fed back to the DNA computer 11. The operations with respect to the partial problems P5 through P8 are carried out in parallel with the operations with respect to the partial problems P1 through P4, and similarly to the operations with respect to the partial problems P1 through P4, such that a solution C8 is output from the DNA computer 11 and fed back to the DNA computer 11. The operations with respect to the partial problems P9 through P12 are also carried out in parallel with the operations with respect to the partial problems P1 through P4, and also similarly to the operations with respect to the partial problems P1 through P4, such that a solution C12 is output from the DNA computer 11 and fed back to the DNA computer 11. The operations end when the solutions C4, C8 and C12 are output from the DNA computer 11 and fed back to the DNA computer 11.

For example, with respect to a test tube containing the DNAs for solving the partial problems corresponding to the nodes belonging to a certain layer, DNAs corresponding to the solution to the partial problem (generally, solutions to a plurality of partial problems) solved in the layer which is one prior to the certain layer are mixed. By combining such solutions similarly as in the case of the serial division method, it is possible to obtain the solution candidates. In order to obtain the final solution, the DNAs representing the solutions to the partial problems corresponding to the nodes of the final layer are collected and fed to the same test tube, and the solution is selected from the solution candidates within the test tube.

Accordingly, as an encoding scheme for the solution to the partial problem, it is possible to represent the solution by a combination of the nucleotide sequence indicating the partial problem and the layer within the layered network, and the nucleotide sequence representing the solution. In addition, the nucleotide sequence representing the solution to the partial problem may be arranged at the center portion, and the nucleotide sequence indicating the partial problem and the layer within the layered network may be arranged on both sides thereof. In order to synthesize the nucleotide sequence representing the solution to the problem from the nucleotide sequences representing the solutions to the partial problems, it is possible to use a combination of the nucleotide sequences representing the partial problems as a primer.

In the case of the layered network division method, the order of the layers within the layered network may be switched or interchanged. In this case, the order of the layers corresponds to the chromosome.

2.5 Suppression of Error Generation Rates of Solution

When using the serial division method, it is desirable to solve the partial problems in an order which minimizes the error generation rate of the solution obtained by the DNA computer, with respect to the problem for which the order in which the partial problems are solved may be switched or interchanged. The order in which the partial problems are solved can be obtained by the genetic algorithm (GA). A fitness f of the chromosome of the genetic algorithm is computed based on an error generation rate ER of the final solution to the problem, and are defined by one of the following formulas (1) through (3), where CR denotes a correct rate of the solution, W1 through W4 denote weighting coefficients, CV1 and CV2 denote constants, CT denotes a computation time required by the DNA computer 11 to compute the solution, and MQ denotes a DNA molecular weight required for the DNA computer 11 to compute the solution.

$$f=CR=100-ER \tag{1}$$

$$f=W1\times(100-ER)+W2\times(CV1-CT) \tag{2}$$

$$f=W3\times(100-ER)+W4\times(CV2-MQ) \tag{3}$$

The formula (1) computes the fitness f based on the error generation rate ER of the final solution. The formula (2) computes the fitness f based on the error generation rate ER of the final solution and the computation time CT required by the DNA computer 11 to compute the solution. In addition, the formula (3) computes the fitness f based on the error generation rate ER of the final solution and the DNA molecular weight MQ required for the DNA computer 11 to compute the solution. The fitness f may also be obtained from an average value of 2 or more fitness values that are computed using the formulas (1) through (3).

Figure 13:
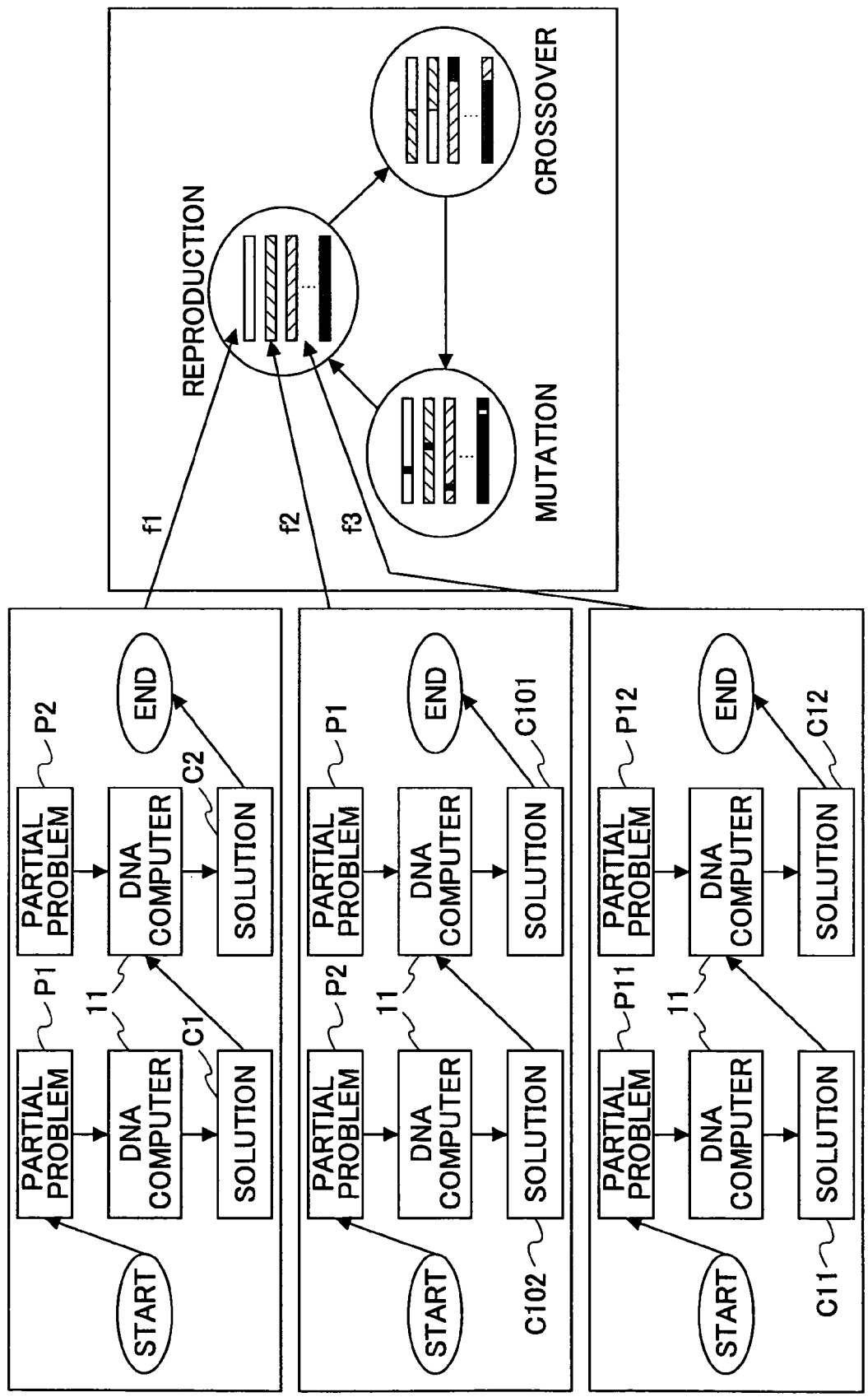
FIG. 13 is a diagram for explaining a control of the DNA computer by the genetic algorithm.

FIG. 13 is a diagram for explaining a control of the DNA computer by the genetic algorithm. In FIG. 13, the fitness is f1 when solving the partial problems P1 and P2 in this order, and the fitness is f2 when solving the problems P2 and P1 in this order. In addition, the fitness is f3 when solving the partial problems P11 and P12 in this order.

The Partially Matched Crossover (PMX) is used for the crossover of the chromosomes. The PMX is a crossover technique that forms child chromosomes without paradox, based on the mapping of genes in the regions of the chromosomes that are the subject of the crossover. But since there are restrictions to the order in which the partial problems are solved, no child is created if the child chromosome does not satisfy the restrictions. The region of the chromosome including a partial problem that requires a long computation time CT for the DNA computer 11 to compute the solution or, a partial problem that requires a large DNA molecular weight MQ for the DNA computer 11 to compute the solution, may be selected as the subject of the crossover, so as to effectively decrease the fitness f.

The mutation transforms 2 genes at a predetermined probability. In the case of the mutation, since there are restrictions to the order in which the partial problems are solved, the mutation is prohibited if the mutation does not satisfy the restrictions. Furthermore, the region of the chromosome including a partial problem that requires a long computation time CT for the DNA computer 11 to compute the solution or, a partial problem that requires a large DNA molecular weight MQ for the DNA computer 11 to compute the solution, may be selected as the region in which the mutation is to occur, so as to effectively increase the fitness f by the mutation.

Figure 14:
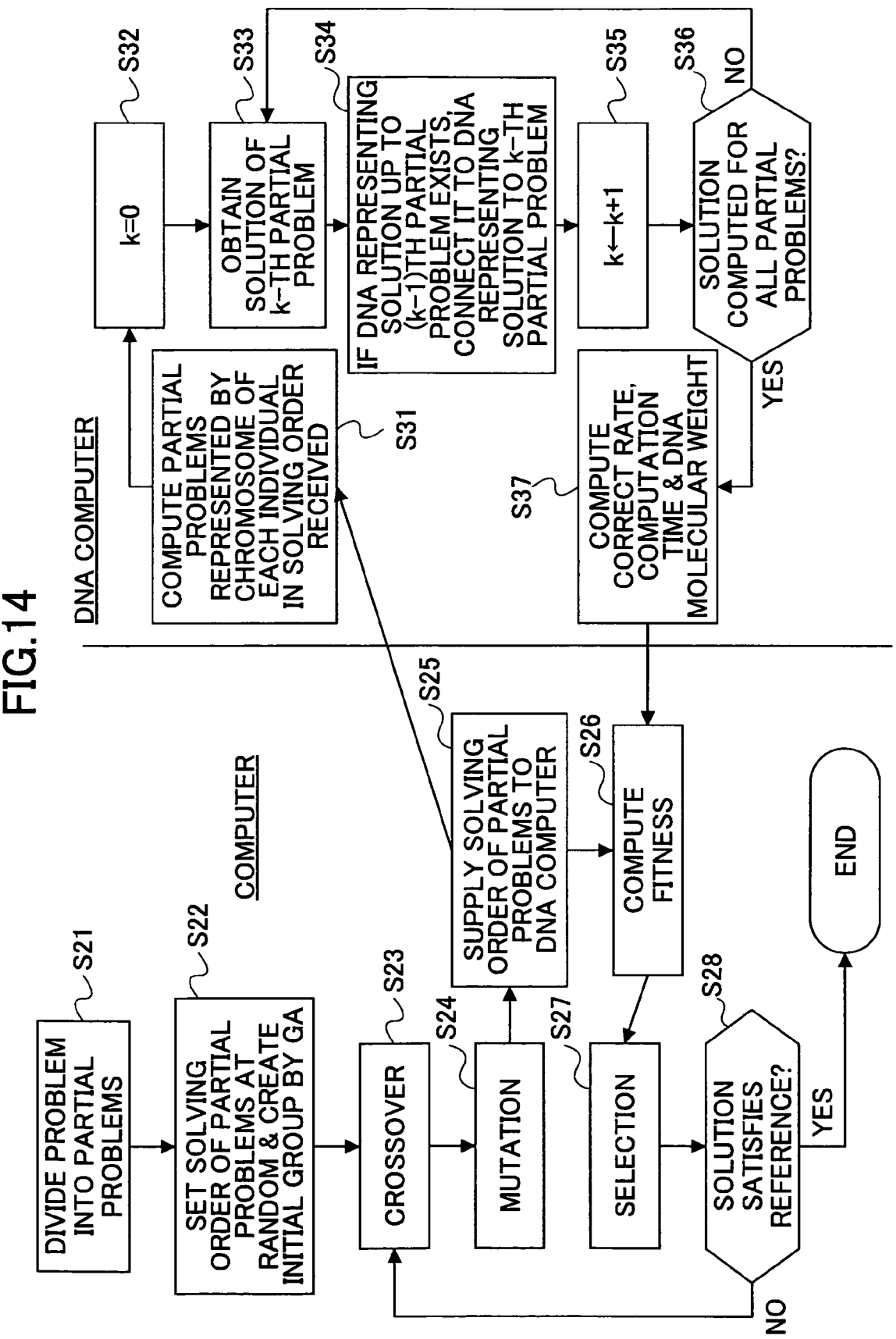
FIG. 14 is a flow chart for explaining the control of the DNA computer by the genetic algorithm.

FIG. 14 is a flow chart for explaining the control of the DNA computer by the genetic algorithm. In FIG. 14, steps S21 through S28 are carried out by a general purpose computer, and steps S31 through S37 are carried out by the DNA computer 11.

In the general purpose computer, the step S21 shown in FIG. 14 divides a problem that is to be solved into partial problems such as those described above. The step S22 sets the order in which the partial problems are to be solved at random, and creates an initial group of solution candidates by the genetic algorithm (GA). The step S23 carries out a crossover operation with respect to the initial group. The step S24 carries out a mutation operation with respect to the initial group, and the step S25 supplies to the DNA computer 11 the order in which the partial problems is to be solved. The step S26 computes the fitness f based on information related to the correct rate CR of the solution and the like received from the DNA computer 11. The step S27 selects an order in which the partial problems are to be solved, that minimizes the error generation rate ER of the solution obtained by the DNA computer 11, based on the fitness f, of the orders in which the partial problems may be solved. The step S28 judges whether or not the solutions to the partial problems solved in the selected order satisfy a certain reference (restriction), and the process returns to the step S23 if the judgement result in the step S28 is NO. On the other hand, the process of the general purpose computer ends if the judgement result in the step S28 is YES.

In the DNA computer 11, the step S31 computes the partial problems represented by the chromosome of each individual in the partial problem solving order received from the step S25. The step S32 sets the order k of the k-th partial problem to k=0. The step S33 obtains the solution to the k-th partial problem. The step S34 combines the DNA representing the solution to the k-th partial problem with the DNA representing the solution to the (k−1)-th partial problem if it exists. The step S35 increments k to k=k+1. The step S36 judges whether or not the solutions to all of the partial problems have been computed, and the process returns to the step S33 if the judgement result in the step S36 is NO. On the other hand, if the judgement result in the step S36 is YES, the step S37 computes the information that is required to compute the fitness f, such as the correction rate CR of the solution (or the error generation rate ER), the computation time CT and the DNA molecular weight MQ, based on the formulas (1) through (3) described above, and supplies the computed information to the general purpose computer. More particularly, the step S37 supplies the information required to compute the fitness f to the step S26.

Next, a case will be considered where the original problem P is to synthesize DNAs by combining 5 different kinds of oligonucleotides (DNA fragments) D0, D1, D2, D3 and D4 so that the DNA sequence has a predetermined length amounting to 9 bases or less and the contents of G and C (hereinafter simply referred to as GC content) are large. In other words, this problem P is to "obtain DNA having a length that is 9 bases or less and having largest GC content". FIG. 15 is a diagram showing a relationship of the length and the GC content of the oligonucleotides (DNA fragments) that are combined.

In this case, the partial problems P1 through P3 are defined as follows. The partial problem P1 is to "create a DNA by 1 oligonucleotide having a length of 9 bases or less". The partial problem P2 is to "create a DNA by 2 oligonucleotides having a length of 9 bases or less". The partial problem P3 is to "create a DNA by 3 oligonucleotides having a length of 9 bases or less". In this case, the restricted solution candidates are the DNAs having the length of 9 bases or less.

First, it is assumed that 5 kinds of oligonucleotides (DNA fragments) D0, D1, D2, D3 and D4 exist within the test tube. In this case, the oligonucleotides D0, D1, D2, D3 and D4 each have a length of 9 bases or less, and as may be seen from FIGS. 16 through 20, these oligonucleotides D0, D1, D2, D3 and D4 are restricted solution candidates for the partial problem P1.

Figure 16:
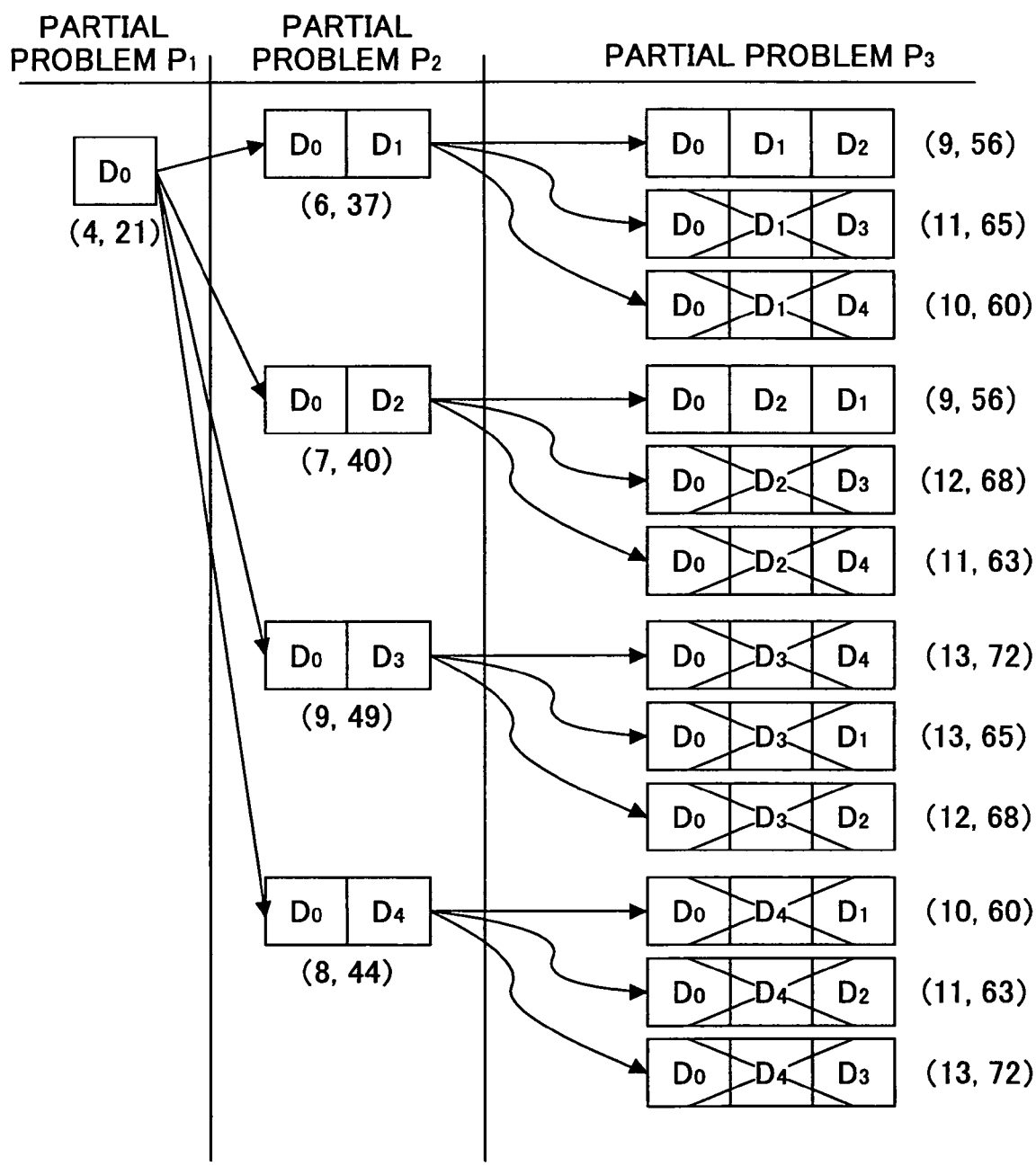
FIG. 16 is a diagram for explaining solution candidates that are created from a restricted solution candidate D0 using an evolution technique.
Figure 17:
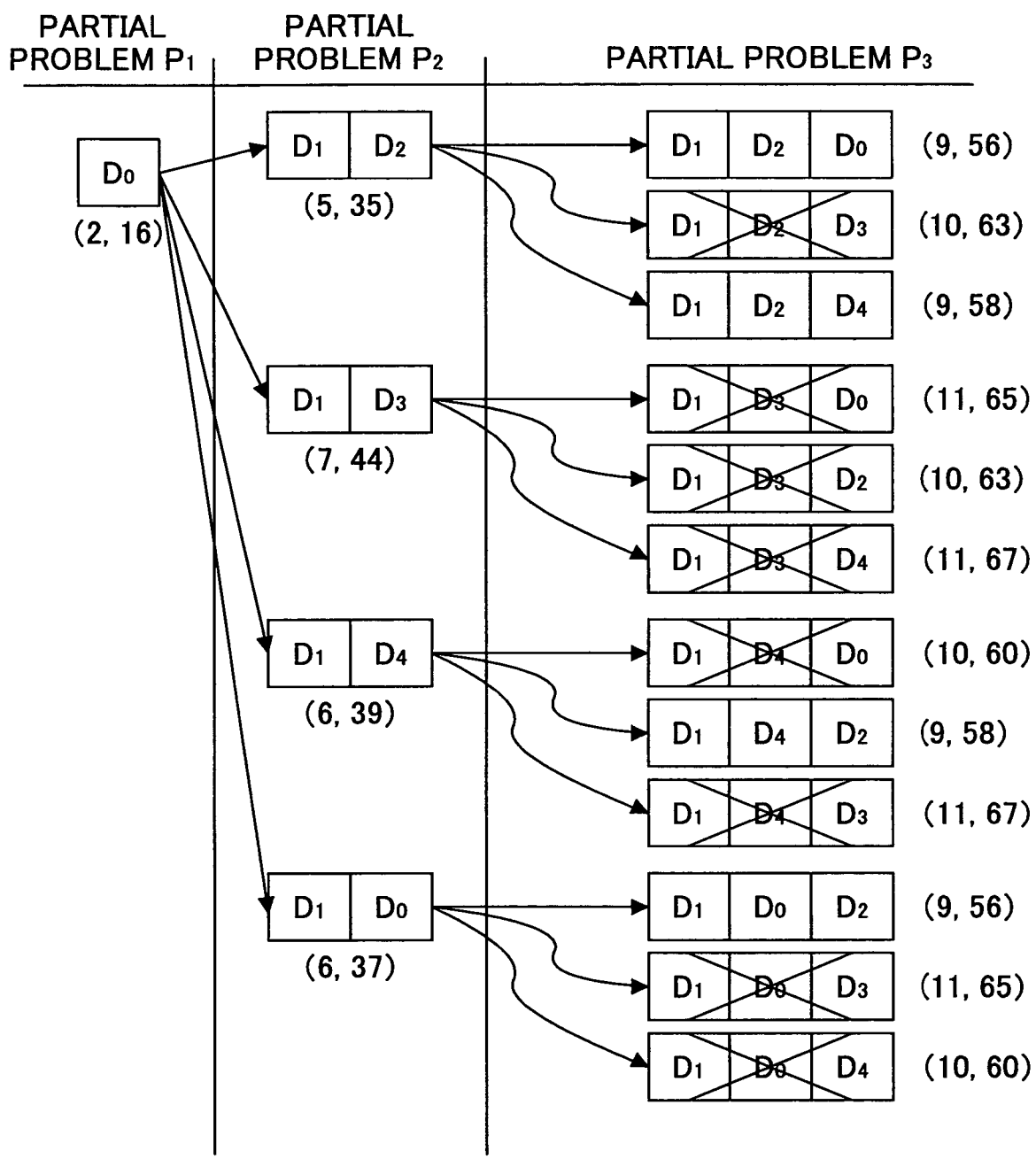
FIG. 17 is a diagram for explaining solution candidates that are created from a restricted solution candidate D1 using the evolution technique.
Figure 18:
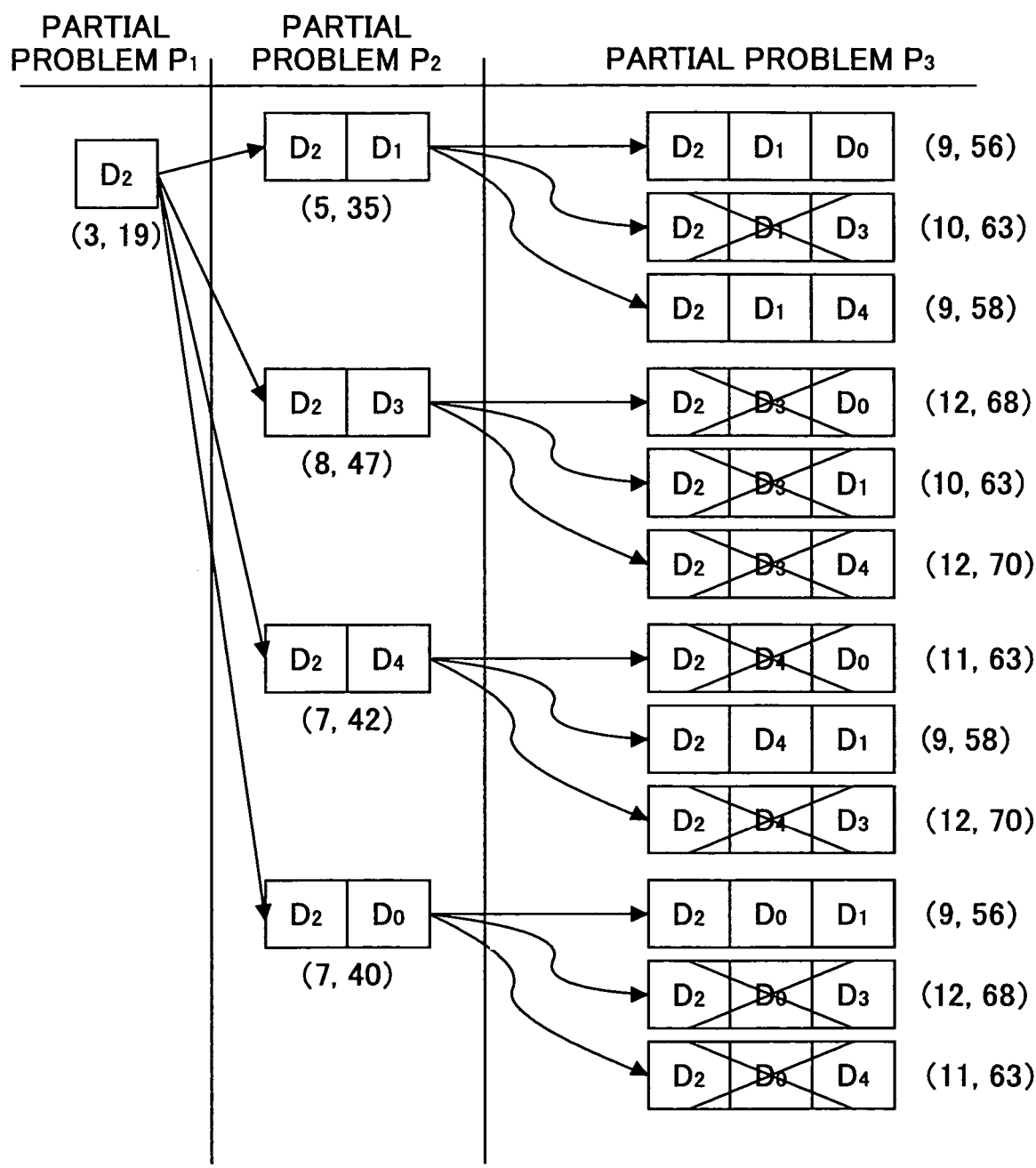
FIG. 18 a diagram for explaining solution candidates that are created from a restricted solution candidate D2 using the evolution technique.
Figure 19:
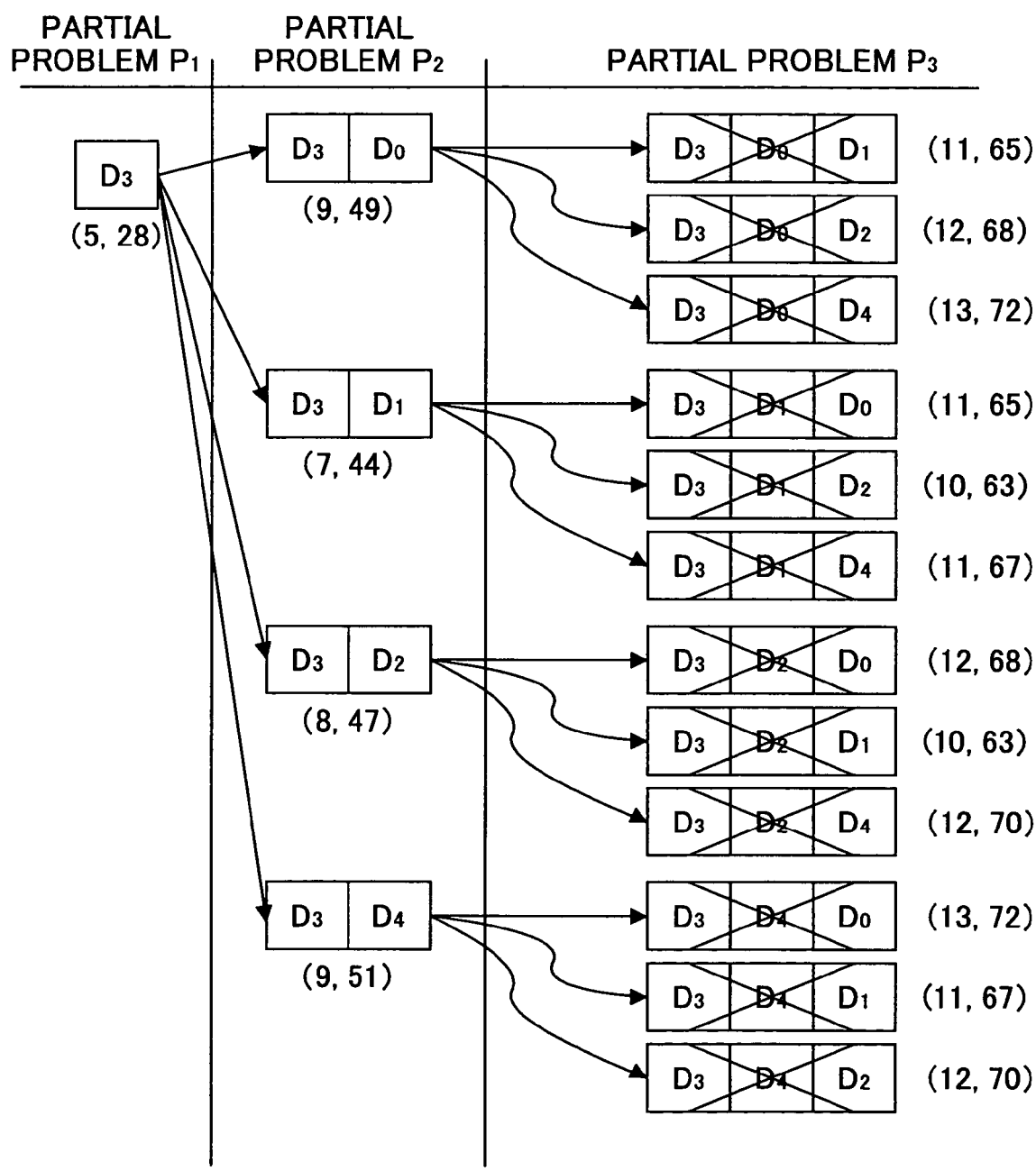
FIG. 19 a diagram for explaining solution candidates that are created from a restricted solution candidate D3 using the evolution technique.
Figure 20:
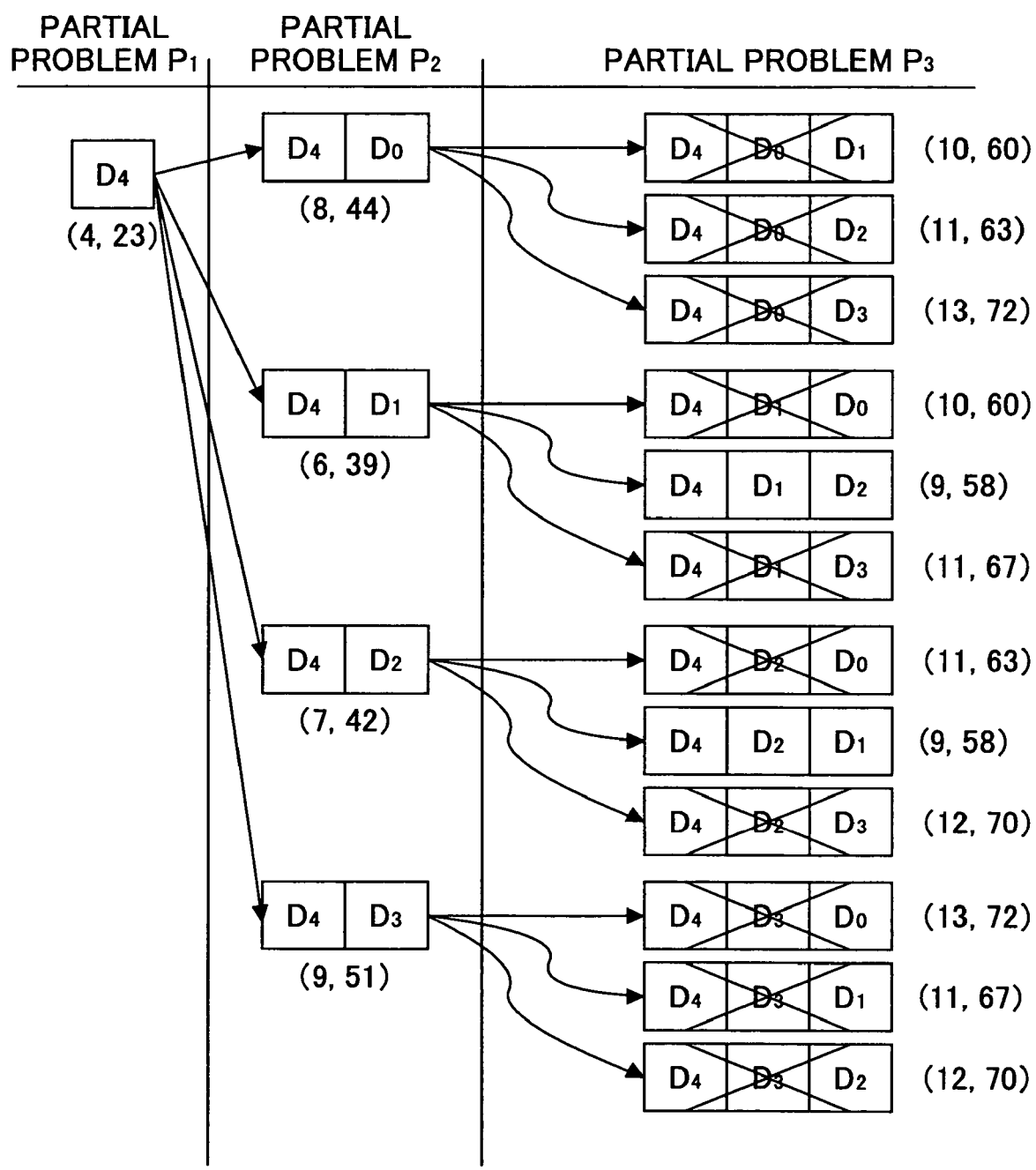
FIG. 20 a diagram for explaining solution candidates that are created from a restricted solution candidate D4 using the evolution technique.

FIG. 16 is a diagram for explaining the restricted solution candidates that are created from the restricted solution candidate D0 using the evolution technique. FIG. 17 is a diagram for explaining the restricted solution candidates that are created from the restricted solution candidate D1 using the evolution technique. FIG. 18 a diagram for explaining the restricted solution candidates that are created from the restricted solution candidate D2 using the evolution technique. FIG. 19 a diagram for explaining the restricted solution candidates that are created from the restricted solution candidate D3 using the evolution technique. FIG. 20 a diagram for explaining the restricted solution candidates that are created from the restricted solution candidate D4 using the evolution technique. In FIGS. 16 through 20, the DNAs marked "X" are not restricted solution candidates and thus, the actual DNAs are not created for such. In addition, the numerals in brackets shown near each restricted solution candidate indicate the length of the base sequence of the restricted solution candidate by the first numeral, and the GC content (in arbitrary units) of the restricted solution candidate by the second numeral.

The restricted solution candidates for the partial problem P2 are obtained using the restricted solution candidates D0, D1, D2, D3 and D4 for the partial problem P1. First, oligonucleotides D0-D1, D0-D2, D0-D3 and D0-D4 obtained by adding oligonucleotides D1, D2, D3 and D4 to the oligonucleotide (DNA fragment) D0 are considered. The lengths of the oligonucleotides D0-D1, D0-D2, D0-D3 and D0-D4 respectively are 6, 7, 9 and 8 bases, and the GC contents of the oligonucleotides D0-D1, D0-D2, D0-D3 and D0-D4 respectively are 37, 40, 49 and 44. In other words, since the oligonucleotides D0-D1, D0-D2, D0-D3 and D0-D4 each have a length of 9 bases or less and each are a restricted solution candidate, the DNA computer 11 is actually operated to create the corresponding DNAs. As may be seen from FIG. 16, it may be shown that: oligonucleotides D1-D2, D1-D3, D1-D4 and D1-D0 obtained by adding oligonucleotides D2, D3, D4 and D0 to the oligonucleotide D1; oligonucleotides D2-D3, D2-D4, D2-D0 and D2-D1 obtained by adding oligonucleotides D3, D4, D0 and D1 to the oligonucleotide D2; oligonucleotides D3-D4, D3-D0, D3-D1 and D3-D2 obtained by adding oligonucleotides D4, D0, D1 and D2 to the oligonucleotide D3; and oligonucleotides D4-D0, D4-D1, D4-D2 and D4-D3 obtained by adding oligonucleotides D0, D1, D2 and D3 to the oligonucleotide D4 are also restricted solution candidates.

Next, the restricted solution candidates for the partial problem P3 are obtained using the restricted solution candidates for the partial problem P2. First, an oligonucleotide D0-D1-D2 obtained by adding the oligonucleotide D2 to the oligonucleotide D0-D1 is considered. Since the oligonucleotide D0-D1-D2 has a length of 9 bases or less and is a restricted solution candidate, the DNA computer 11 is actually operated to create the corresponding DNA.

Next, an oligonucleotide D0-D1-D3 obtained by adding the oligonucleotide D3 to the oligonucleotide D0-D1 is considered. Since the oligonucleotide D0-D1-D3 has a length of 11 bases which is not 9 bases or less and is not a restricted solution candidate, the DNA computer 11 is not actually operated and no corresponding DNA is created. No corresponding DNA is created for an oligonucleotide D0-D1-D4 that is obtained by adding the oligonucleotide D4 to the oligonucleotide D0-D1, for similar reasons. In other words, by clarifying by computer simulation whether or not a restricted solution candidate for a partial problem Pk+1 derived from a certain restricted solution candidate for a partial problem Pk becomes the actual solution candidate, the operations of the DNA computer 11 are not carried out if the restricted solution candidate for the partial problem Pk does not become the actual solution candidate, so as to improve the computation efficiency of the DNA computer 11.

Figure 21:
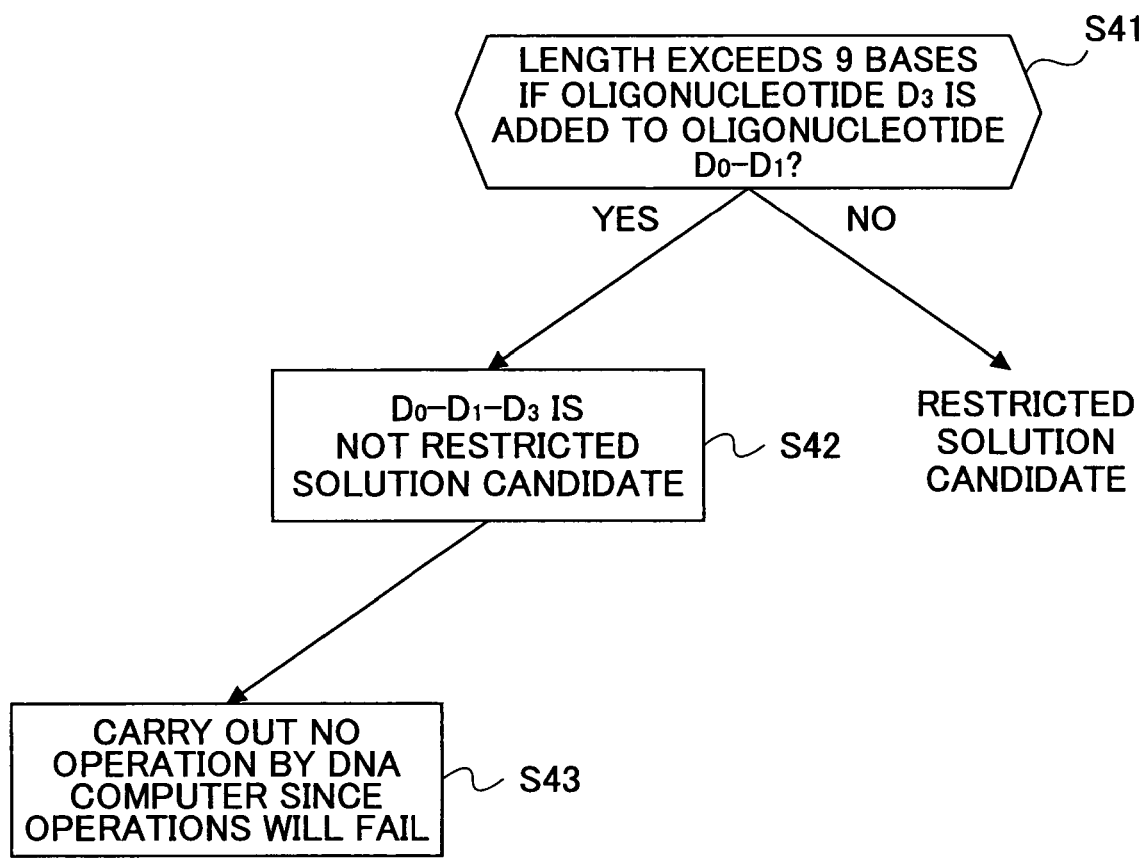
FIG. 21 is a flow chart for explaining a method of omitting unnecessary operations using the evolution technique.

FIG. 21 is a flow chart for explaining a method of omitting unnecessary operations using the evolution technique. In FIG. 21, a step S41 judges whether or not the length of the resulting oligonucleotide exceeds 9 bases if the oligonucleotide D3 is added to the oligonucleotide D0-D1. If the judgement result in the step S41 is NO, it is judged that the resulting oligonucleotide D0-D1-D3 is a restricted solution candidate since its length is 9 bases or less. On the other hand, if the judgement result in the step S41 is YES, a step S42 judges that the resulting oligonucleotide D0-D1-D3 is not a restricted solution candidate. In addition, a step S43 does not carry out the operations by the DNA computer 11 since the operations will fail with respect to the resulting oligonucleotide D0-D1-D3.

Next, an oligonucleotide D0-D2-D1 obtained by adding the oligonucleotide D1 to the oligonucleotide D0-D2 is considered. Since the oligonucleotide D0-D2-D1 has a length of 9 bases and is a restricted solution candidate, the DNA computer 11 is actually operated to create the corresponding DNA.

The length of the oligonucleotide D0-D3 is already 9 bases, and thus, no further oligonucleotides are added thereto. The length of the resulting oligonucleotide will exceed 9 bases if any one of the oligonucleotides D1, D2 and D3 is added to the oligonucleotide D0-D4, and hence, no further oligonucleotides are added to the oligonucleotide D0-D4.

In the case of the oligonucleotide D1-D2, the oligonucleotides D1-D2-D0 and D1-D2-D4 have a length of 9 bases and become restricted solution candidates, but the oligonucleotide D1-D2-D3 has a length of 10 bases which exceeds 9 bases and does not become a restricted solution candidate. Moreover, the oligonucleotides D1-D3-D0, D1-D3-D2 and D1-D3-D4 each have a length of 10 bases or more and do not become restricted solution candidates.

Next, an oligonucleotide D1-D4-D0 obtained by adding the oligonucleotide D0 to the oligonucleotide D1-D4 is considered. The oligonucleotide D1-D4-D0 has a length of 10 bases which exceeds 9 bases and does not become a restricted solution candidate. However, the restricted solution candidate (oligonucleotide) D1-D4 which is one prior to the oligonucleotide D1-D4-D0 is stored. Hence, an oligonucleotide D1-D4-D2 can be obtained by adding the oligonucleotide D2 to the stored solution candidate (oligonucleotide) D1-D4. The oligonucleotide D1-D4-D2 has a length of 9 bases and becomes a restricted solution candidate, and procedures similar to those described above are repeated.

In other words, in a case where it is clarified by computer simulation that a solution candidate γk+1 (not necessarily a restricted solution candidate) for the partial problem Pk+1 does not become a solution to the problem P, a technique is used to create a solution candidate different from the solution candidate γk+1 from the restricted solution candidate Ck for the partial problem Pk which is one prior to the partial problem Pk+1 and to find the restricted solution candidate for the partial problem Pk+1, so as to improve the computation efficiency of the DNA computer 11.

Figure 22:
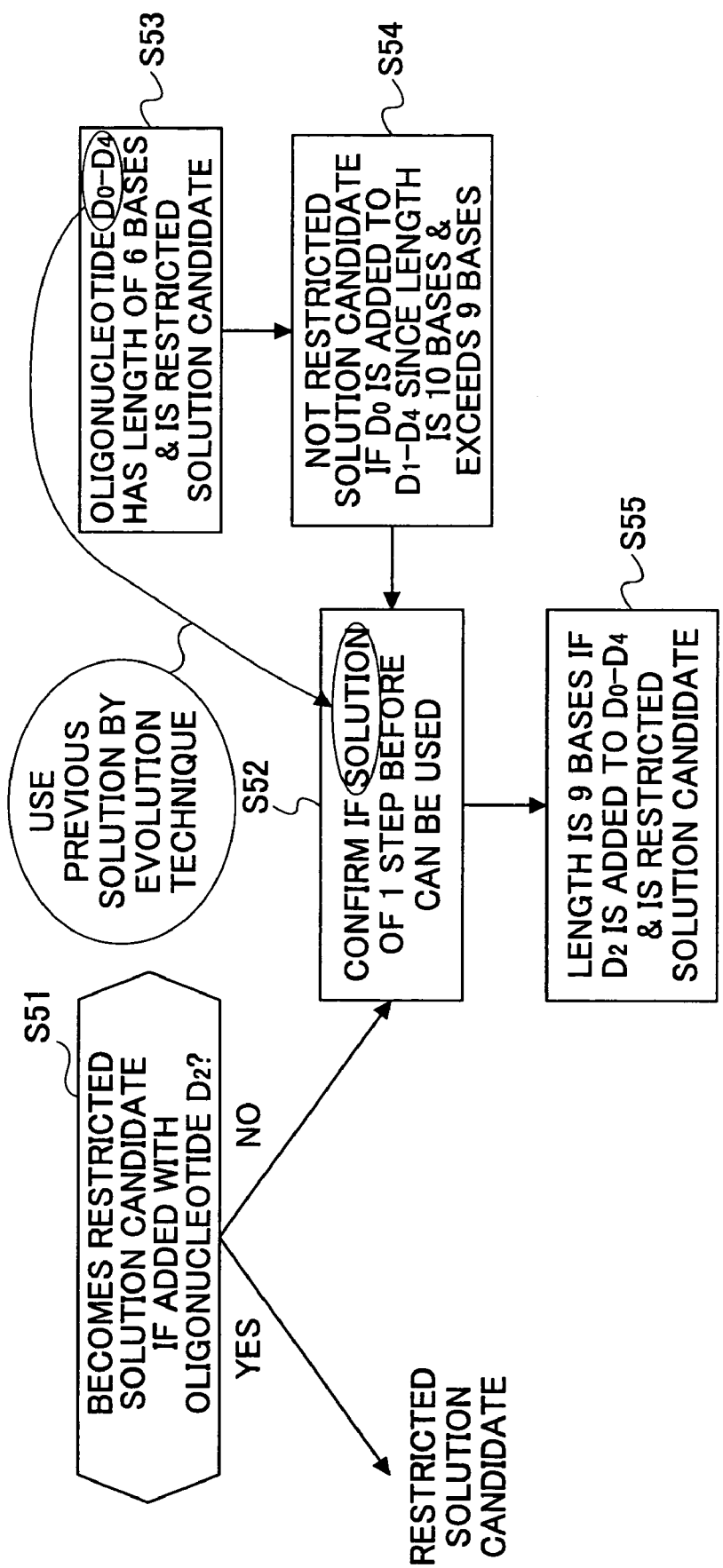
FIG. 22 is a flow chart for explaining a technique that increases the computation speed by referring to previous computation results using the evolution technique.

FIG. 22 is a flow chart for explaining a technique that increases the computation speed by referring to previous computation results using the evolution technique. In FIG. 22, a step S51 judges whether or not the oligonucleotide D1-D4 when added with the oligonucleotide D2, for example, becomes a restricted solution candidate. If the judgement result in the step S51 is YES, it is judged that the oligonucleotide D1-D4-D2, for example, is a restricted solution candidate. On the other hand, if the judgement result i the step S51 is NO, a step S52 confirms whether or not the solution of the step one prior to the present can be used. In this case, the step one prior to the present refers to a step S53, for example. The step S53 has judged that the oligonucleotide D1-D4 has a length of 6 bases and is a restricted solution candidate. In addition, a step S54 has judged that the oligonucleotide D1-D4-D0 obtained by adding the oligonucleotide D0 to the oligonucleotide D1-D4 has a length of 10 bases which exceeds 9 bases and is not a restricted solution candidate. Accordingly, in this particular case, the step S52 confirms that the solution of the step one prior to the present can be used, and a step S55 judges that the oligonucleotide D1-D4-D2 obtained by adding the oligonucleotide D2 to the oligonucleotide D1-D4 has a length of 9 bases and is a restricted solution candidate.

The restricted solution candidates that are first obtained from the restricted solution candidate D1 for the partial problem P1 become as shown in FIG. 17. Similarly, the restricted solution candidates that are first obtained from the restricted solution candidate D2 for the partial problem P1 become as shown in FIG. 18. The restricted solution candidates that are first obtained from the restricted solution candidate D3 for the partial problem P1 become as shown in FIG. 19. The restricted solution candidates that are first obtained from the restricted solution candidate D4 for the partial problem P1 become as shown in FIG. 20.

When the DNA sequence having the largest GC content is obtained by the DNA computer 11, the sequences D1-D2-D4, D1-D4-D2, D2-D1-D4, D2-D4-D1, D4-D1-D2 and D4-D2-D1 are obtained as the solutions having the length of 9 bases and the GC content of 58.

As described in Hagitani et al., "DNA Computer", Baifukan, pp. 137–143, 2001 referred above, it is desirable that the GC contents of the DNA sequences are matched in order for the DNA computer to operate normally. By matching the GC contents of the DNA sequences, it is possible to obtain stable codes for the DNA computer.

2.6 Application of Genetic Algorithm

As described in Hagitani et al., in order to accurately operate the DNA computer 11, it is necessary to match the dissolution temperatures of the DNA which is the subject of the amplification by the PCR and the primer which is a complementary DNA fragment. It is known that a necessary condition for matching such dissolution temperatures is to desirably match the GC contents of the DNA sequences. Suppose that a problem is formed by 3 partial problems $\alpha$, $\beta$ and $\gamma$, and that chromosomes $\{\alpha, \beta, \gamma\}$, $\{\beta, \alpha, \gamma\}$, $\{\alpha, \gamma, \beta\}$ and the like of the genetic algorithm are in the order in which the partial problems are to be solved. As described in Hagitani et al., if an error is generated in the solution to the first partial problem, the error propagates to the latter computation, to deteriorate the computation accuracy of the DNA computer 11.

The fitness f of 1 chromosome can be computed in the following manner. For example, in the case of the chromosome $\{\alpha, \gamma, \beta\}$, if solution candidates for the partial problem $\alpha$ are a1 and a2, solution candidates for the partial problem $\beta$ are b1 and b2, and solution candidates for the partial problem $\gamma$ are c1 and c2, the DNAs of the solution candidates are also represented by the same symbols, and for example, the GC content of the solution candidate a1 is represented by gc(a1) and similar representations are used for the GC contents of other solution candidates. In the following formula (4), CV3 denotes a constant. In addition, FIG. 23 is a diagram for explaining the GC content of the solution candidates (in arbitrary units).

$$f = CV3 - [2^3\{(*gc\alpha - gc(a1))^2 + (*gc\alpha - gc(a2))^2\} + 2^2\{(*gc\gamma - gc(c1))^2 + (*gc\gamma - gc(c2))^2\} + 2\{*gc\beta - gc(b1))^2 + (*gc\beta - gc(b2))^2\}] \quad (4)$$

In the formula (4), $*gc\alpha$ denotes an average value of the GC contents of the solution candidates a1 and a2, $*gc\beta$ denotes an average value of the GC contents of the solution candidates b1 and b2, and $*gc\gamma$ denotes an average value of the GC contents of the solution candidates c1 and c2. As may be seen from the formula (4), the fitness f becomes larger if the inconsistency in the GC content of the solution to the partial problem that is to be solved first becomes smaller.

Suppose that an initial group $[\{\alpha, \beta, \gamma\}, \{\beta, \alpha, \gamma\}, \{\beta, \gamma, \alpha\}, \{\gamma, \beta, \alpha\}]$ of the genetic algorithm formed by 4 individuals is prepared. If the constant CV3=100 in the formula (4) described above, the fitness f may be obtained from the following formulas (5) through (8).

$$f[\{\alpha, \beta, \gamma\}] = 60 \quad (5)$$

$$f[\{\beta, \alpha, \gamma\}] = 30 \quad (6)$$

$$f[\{\beta, \gamma, \alpha\}] = 27 \quad (7)$$

$$f[\{\gamma, \beta, \alpha\}] = 51 \quad (8)$$

When $\{\alpha, \beta, \gamma\}$ and $\{\beta, \gamma, \alpha\}$ are subject to the crossover, it is possible to obtain the same individual as the parent individual. If a mutation that replaces the second and third genes is carried out with respect to $\{\alpha, \beta, \gamma\}$ and $\{\gamma, \beta, \alpha\}$, $\{\alpha, \gamma, \beta\}$ and $\{\gamma, \alpha, \beta\}$ are obtained, and the fitness f may be obtained from the following formulas (9) and (10).

$$f[\{\alpha, \gamma, \beta\}] = 72 \quad (9)$$

$$f[\{\gamma, \alpha, \beta\}] = 66 \quad (10)$$

Accordingly, the solution candidate $\{\alpha, \gamma, \beta\}$ has the largest fitness f in this case, and gives the optimum solution.

2.7 Application to Effective Hamiltonian Path Problem

It is difficult to find a general algorithm for dividing a given problem into partial problems. However, if the given problem has a regularity to a certain extent, it is possible to divide the given problem into the partial problems using this regularity.

Figure 24:
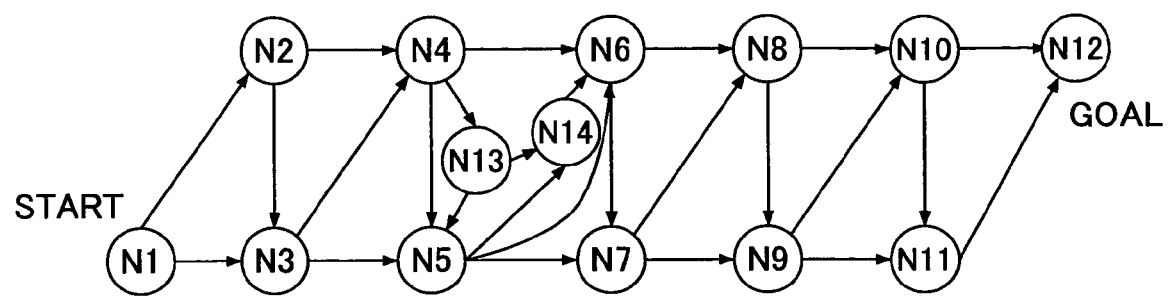
FIG. 24 is diagram showing an effective graph that indicates an effective Hamiltonian path problem.
Figure 25:
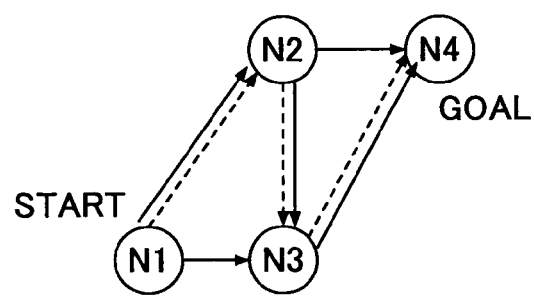
FIG. 25 is a diagram showing partial problems of the problem shown in FIG. 24.
Figure 26:
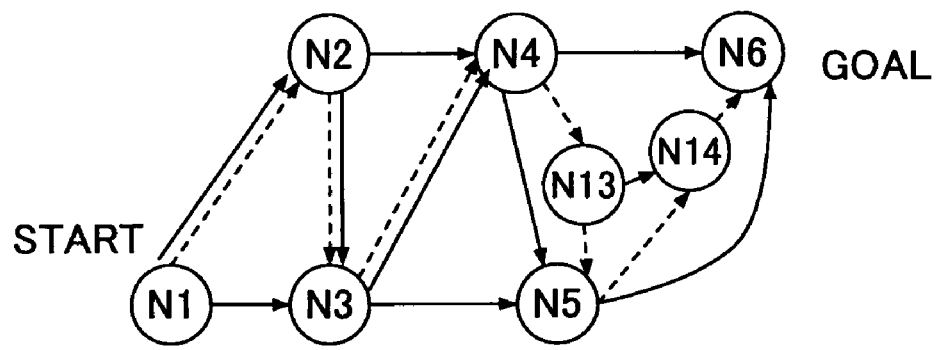
FIG. 26 is a diagram showing partial problems including the partial problems shown in FIG. 25.
Figure 27:
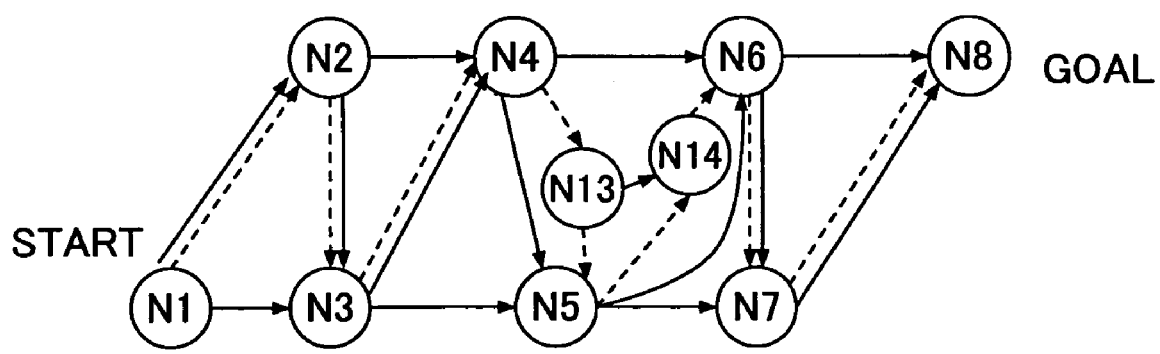
FIG. 27 is a diagram showing partial problems including the partial problems shown in FIG. 26.
Figure 28:
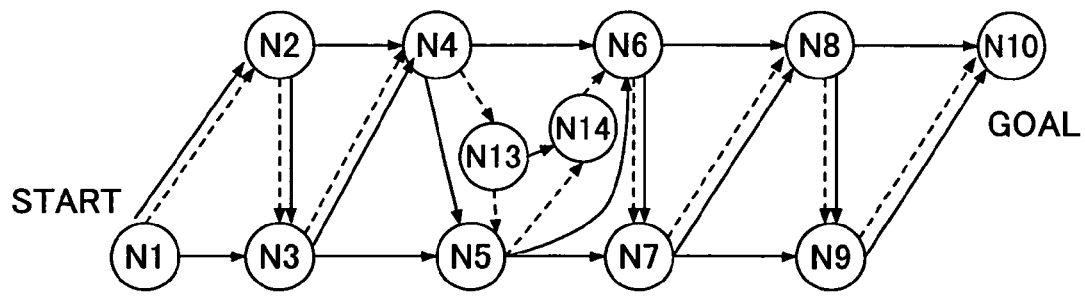
FIG. 28 is a diagram showing partial problems including the partial problems shown in FIG. 27.
Figure 29:
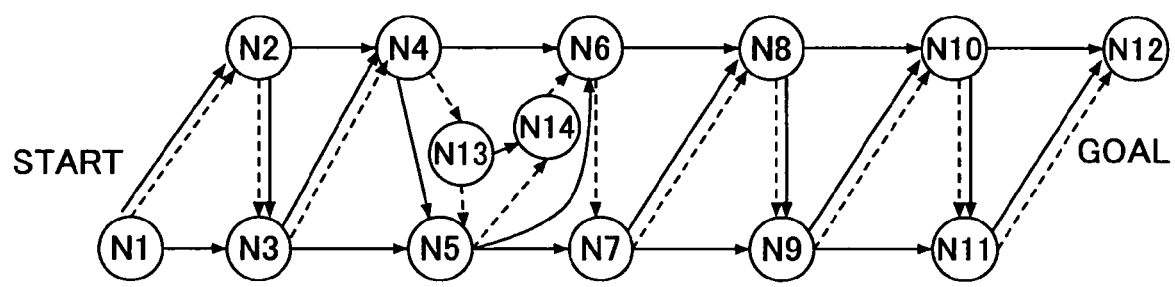
FIG. 29 is a diagram showing partial problems including the partial problems shown in FIG. 28.

FIG. 24 is diagram showing an effective graph that indicates the effective Hamiltonian path problem. FIG. 24 shows an effective Hamiltonian path problem having 14 nodes N1 through N14 and to judge whether or not there exists a system of sides having a direction and always including each node (vertex) only once from the node N1 at a starting point to the node N12 at a goal point. As may be seen from FIG. 24, partial graphs having the same structure exist in this effective graph. By using this regularity of the effective graph, partial graphs shown in FIGS. 25 through 29 are considered. FIG. 25 is a diagram showing partial problems of the problem shown in FIG. 24, FIG. 26 is a diagram showing partial problems including the partial problems shown in FIG. 25, FIG. 27 is a diagram showing partial problems including the partial problems shown in FIG. 26, FIG. 28 is a diagram showing partial problems including the partial problems shown in FIG. 27, and FIG. 29 is a diagram showing partial problems including the partial problems shown in FIG. 28. In FIGS. 25 through 29, an arrow indicated by a dotted line indicates the Hamiltonian path. In addition, the partial graph corresponds to the partial problem Pk (k=1, 2, 3, 4, 5).

The DNA computer itself for solving the effective Hamiltonian path problem is already proposed in Leonard M. Adleman, "Molecular computation of solutions to combinational problems", SCIENCE, 266 (5187), pp. 1021–1024, 1994 referred above. Hence, by encoding the 14 nodes N1 through N14 and the 25 effective sides as shown in FIGS. 30 and 31, it is possible to solve the effective Hamiltonian path problem shown in FIG. 24 by using the DNA computer proposed by Leonard M. Adleman as the DNA computer 11. FIG. 30 is a diagram for explaining an encoding scheme for the nodes of the effective Hamiltonian path problem, and FIG. 31 is a diagram for explaining an encoding scheme for the effective sides of the effective Hamiltonian path problem.

In this case, by successively solving the partial problems in the following manner, it is possible to reduce the computation time CT required to compute the solution by the DNA computer 11 and the DNA molecular weight MQ required to compute the solution by the DNA computer 11. In other words, the solution candidate may be obtained by the method proposed by Leonard M. Adleman utilizing the DNAs that are obtained by encoding the nodes and the effective sides related to the partial problem shown in FIG. 25. In this case, it is necessary to determine which one of the nodes N2, N3 and N4 is to be regarded as the goal point. In this embodiment, it is possible to know in advance by computer simulation that there is no solution for the case where the node N2 or N3 is selected as the goal point, before using the DNA computer 11, and thus, it is possible to efficiently utilize the DNA computer 11 by excluding in advance the partial problem having such a goal point for which there is no solution.

In addition, the partial problem shown in FIG. 25 having the node N4 as the goal point is solved by the DNA computer 11. Next, into the test tube that contains the DNAs representing the solution candidates for this partial problem, the DNAs shown in FIGS. 30 and 31 corresponding to the nodes N5, N6, N13 and N14 and the effective sides 4→5, 4→6, 4→13, 5→6, 5→14, 13→5, 13→14 and 14→6 that are shown in FIG. 26 and newly used, are fed, where x→y indicates an effective side connecting nodes Nx and Ny. Then, the node N6 is set as the goal point as shown in FIG. 26, similarly to the method described above, and the solution candidate is obtained by the method proposed by Leonard M. Adleman. By repeating similar operations up to the partial problem shown in FIG. 29, it is possible to efficiently solve the effective Hamiltonian path problem by the DNA computer 11 employing the method proposed by Leonard M. Adleman.

As described above, the present invention combines the DNA computer and the evolution technique, so as to efficiently carry out the computations by reducing the computation time required by the DNA computer to compute the solution and reducing the DNA molecular weight required by the DNA computer to compute the solution. In addition, by dividing the problem treated by the DNA computer into the partial problems, it is possible to effectively generate the solution candidates, and efficiently search the solution to the problem. Moreover, by combining the DNA computer and the genetic algorithm, it is possible to efficiently carry out the computations by suppressing the error generation rate of the solution that is computed by the DNA computer.

Further, the present invention is not limited to these embodiments, but various variations and modifications may be made without departing from the scope of the present invention.

What is claimed is:

1. A DNA computer for carrying out computations using DNAs, comprising:
    a dividing part configured to divide a problem that is to be solved into a plurality of partial problems; and
    an operation part configured to obtain a DNA sequence corresponding to a solution to the problem, by combining DNA sequences corresponding to solutions of the plurality of partial problems.

2. The DNA computer as claimed in claim 1, further comprising:
    an optimizing part configured to optimize a parameter of the DNA computer by a genetic algorithm.

3. The DNA computer as claimed in claim 2, wherein the parameter indicates a computation order in which the operation part solves the plurality of partial problems.

4. The DNA computer as claimed in claim 2, wherein a fitness of a chromosome of the genetic algorithm is based on at least one of a correct rate of solution to the problem obtained by the DNA computer, a computation time required by the DNA computer to compute the solution to the problem, and a DNA molecular weight required by the DNA computer to compute the solution to the problem.

5. The DNA computer as claimed in claim 1, wherein the dividing part employs a serial division method that uses a solution to a partial problem Pk as a portion of an input used to solve a partial problem Pk+1.

6. The DNA computer as claimed in claim 5, wherein the operation part encodes the solutions to the plurality of partial problems by representing each solution by a DNA sequence indicating the partial problem and a DNA sequence representing the solution.

7. The DNA computer as claimed in claim 6, wherein the operation part arranges the DNA sequence representing the solution to the partial problem at a center portion, and the DNA sequence indicating the partial problem on both sides thereof.

8. The DNA computer as claimed in claim 5, wherein the operation part uses a combination of the DNA sequences representing the plurality of partial problems as a primer in order to synthesize the DNA sequence representing the solution to the problem from the DNA sequences representing the solutions to the plurality of partial problems.

9. The DNA computer as claimed in claim 5, wherein the dividing part divides the problem into the plurality of partial problems according to order of solving ease.

10. The DNA computer as claimed in claim 5, wherein the operation part switches or interchanges a solving order of the plurality of partial problems.

11. The DNA computer as claimed in claim 1, wherein the dividing part employs a layered network division method that uses a solution to each partial problem as a portion of an input used to solve one or more other partial problems, and represents a graph in which nodes are connected by arcs by regarding the plurality of partial problems as nodes, in the form of a layered network.

12. The DNA computer as claimed in claim 11, wherein the operation part encodes the solutions to the plurality of partial problems by representing each solution by a DNA sequence indicating the partial problem and a layer of the layered network and a DNA sequence representing the solution.

13. The DNA computer as claimed in claim 12, wherein the operation part arranges the DNA sequence representing the solution to the partial problem at a center portion, and the DNA sequence indicating the partial problem and the layer of the layered network on both sides thereof.

14. The DNA computer as claimed in claim 11, wherein the operation part uses a combination of the DNA sequences representing the plurality of partial problems as a primer in order to synthesize the DNA sequence representing the solution to the problem from the DNA sequences representing the solutions to the plurality of partial problems.

15. The DNA computer as claimed in claim 1, further comprising:
    a judging part configured to judge by computer simulation whether or not there is a possibility that a solution to each partial problem will become a portion of the solution to the problem,
    wherein the operation part carries out the computations if there is a possibility that the solution to each partial problem will become the portion of the solution to the problem, and carries out no computation if there is no possibility that the solution to each partial problem will become the portion of the solution to the problem.

16. The DNA computer as claimed in claim 1, further comprising:
    a storing part configured to store a solution to a partial problem, which is one prior to the solution to the partial problem that has become known to finally fail as a result of computer simulation, in a manner usable when obtain a solution to another partial problem.

17. A computation method using a DNA computer that carries out computations using DNAs, comprising:
    a dividing step dividing a problem that is to be solved into a plurality of partial problems; and
    an operation step obtaining a DNA sequence corresponding to a solution to the problem, by combining DNA sequences corresponding to solutions of the plurality of partial problems.

18. The computation method using the DNA computer as claimed in claim 17, further comprising:
    an optimizing step optimizing a parameter of the DNA computer by a genetic algorithm.

19. The computation method using the DNA computer as claimed in claim 17, wherein the dividing step employs a serial division method that uses a solution to a partial problem Pk as a portion of an input used to solve a partial problem Pk+1.

20. The computation method using the DNA computer as claimed in claim 17, wherein the dividing step employs a layered network division method that uses a solution to each partial problem as a portion of an input used to solve one or more other partial problems, and represents a graph in which nodes are connected by arcs by regarding the plurality of partial problems as nodes, in the form of a layered network.

* * * * *

UNITED STATES PATENT AND TRADEMARK OFFICE
CERTIFICATE OF CORRECTION

| | | |
|---|---|---|
| PATENT NO. | : 7,167,847 B2 | Page 1 of 1 |
| APPLICATION NO. | : 11/064027 | |
| DATED | : January 23, 2007 | |
| INVENTOR(S) | : Fumiyoshi Sasagawa | |

It is certified that error appears in the above-identified patent and that said Letters Patent is hereby corrected as shown below:

TITLE PAGE, ITEM (63) (Related U.S. Application Data), Line 1, change "PCT/JP03/00918," to --PCT/JP03/000918,--.

TITLE PAGE, ITEM (56) (Other Publications), Line 3, change "Sossa" to --Sosa--.

Signed and Sealed this

Twenty-second Day of May, 2007

JON W. DUDAS
*Director of the United States Patent and Trademark Office*